(12) United States Patent
Xiao

(10) Patent No.: US 11,966,563 B2
(45) Date of Patent: Apr. 23, 2024

(54) MENU DISPLAY METHOD AND APPARATUS, ELECTRONIC DEVICE, AND STORAGE MEDIUM

(71) Applicant: VIVO MOBILE COMMUNICATION CO., LTD., Dongguan (CN)

(72) Inventor: Yafei Xiao, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 18/128,209

(22) Filed: Mar. 29, 2023

(65) Prior Publication Data
US 2023/0236708 A1 Jul. 27, 2023

Related U.S. Application Data

(63) Continuation of application No. PCT/CN2021/121311, filed on Sep. 28, 2021.

(30) Foreign Application Priority Data

Sep. 30, 2020 (CN) .......................... 202011061766.2

(51) Int. Cl.
*G06F 17/00* (2019.01)
*G06F 3/0482* (2013.01)
*G06F 3/0484* (2022.01)

(52) U.S. Cl.
CPC .......... *G06F 3/0482* (2013.01); *G06F 3/0484* (2013.01)

(58) Field of Classification Search
CPC .. G06F 3/0482; G06F 3/0484; G06F 3/04883; G06F 3/0481; G06F 3/04817; G06F 3/04886; G06F 2203/04883
See application file for complete search history.

(56) References Cited

U.S. PATENT DOCUMENTS

| 9,244,592 B2 * | 1/2016 | Shaw ..................... G06F 3/0482 |
| 10,331,301 B2 * | 6/2019 | Roy .................... G06F 3/04817 |
| 11,379,104 B2 * | 7/2022 | Wheeler ................. G06F 9/451 |

(Continued)

FOREIGN PATENT DOCUMENTS

| CN | 102272701 A | 12/2011 | |
| CN | 103365592 A | * 10/2013 | ........... G06F 3/0412 |

(Continued)

OTHER PUBLICATIONS

International Search Report issued in corresponding International Application No. PCT/CN2021/121311, dated Jan. 6, 2022, 4 pages.

(Continued)

*Primary Examiner* — Laurie A Ries
(74) *Attorney, Agent, or Firm* — IPX PLLC

(57) ABSTRACT

A menu display method, an electronic device, and a non-transitory computer-readable storage medium are provided. The menu display method includes: receiving a first input that is performed on N first controls in a shortcut menu by a user. The menu display method further includes: in a case that N is equal to 1, updating a display status of the first control from a first display size to a second display size in response to the first input; or in a case that N is greater than 1, merging the N first controls into M second controls in response to the first input.

18 Claims, 21 Drawing Sheets

(56) References Cited

U.S. PATENT DOCUMENTS

| | | | |
|---|---|---|---|
| 11,635,928 B2* | 4/2023 | Carrigan | G06F 3/0484 715/716 |
| 2006/0218502 A1 | 9/2006 | Matthews et al. | |
| 2013/0305187 A1 | 11/2013 | Phillips et al. | |
| 2014/0157205 A1* | 6/2014 | Baird | G06F 3/0482 715/843 |
| 2017/0322686 A1* | 11/2017 | Hong | G06F 3/04845 |
| 2019/0073100 A1* | 3/2019 | Li | G06F 3/0483 |
| 2020/0358897 A1* | 11/2020 | Dellinger | H04M 1/72454 |
| 2020/0379635 A1* | 12/2020 | Hughes | G06F 3/0481 |
| 2020/0387270 A1* | 12/2020 | Fang | G06F 3/0482 |

FOREIGN PATENT DOCUMENTS

| | | |
|---|---|---|
| CN | 103365592 A | 10/2013 |
| CN | 108279950 A | 7/2018 |
| CN | 109298821 A | 2/2019 |
| CN | 110174982 A | 8/2019 |
| CN | 110362244 A | 10/2019 |
| CN | 110795189 A * | 2/2020 |
| CN | 110795189 A | 2/2020 |
| CN | 111371952 A | 7/2020 |
| CN | 112148181 A | 12/2020 |
| CN | 112214142 A | 1/2021 |
| EP | 2770414 A2 | 8/2014 |
| EP | 3964934 A1 | 3/2022 |
| IN | 106598383 A | 4/2017 |
| IN | 107613100 A | 1/2018 |
| WO | WO-2015070070 A1 * | 5/2015 ........... G06F 3/0482 |

OTHER PUBLICATIONS

First Office Action issued in related Chinese application No. 202011061766.2, dated Aug. 18, 2021, 9 pages.

Extended European Search Report issued in related European Application No. 21874474.6, mailed Feb. 16, 2024, 7 pages.

* cited by examiner

MENU DISPLAY METHOD AND APPARATUS, ELECTRONIC DEVICE, AND STORAGE MEDIUM

CROSS-REFERENCE TO RELATED APPLICATIONS

This application is a continuation of International Application No. PCT/CN2021/121311, filed on Sep. 28, 2021, which claims priority to Chinese Patent Application No. 202011061766.2, filed on Sep. 30, 2020. The entire contents of each of the above-referenced applications are expressly incorporated herein by reference.

TECHNICAL FIELD

This application pertains to the field of communication technologies, and specifically relates to a menu display method and apparatus, an electronic device, and a storage medium.

BACKGROUND

With the development of mobile terminals, functions of the mobile terminal are increasingly improved. On the mobile terminal, a control center is generally provided to provide a shortcut menu for implementing some shortcut operations, so that in a case of not entering a corresponding function menu, a control in the shortcut menu may be operated to implement a related function. In a process of implementing this application, there is at least the following problem in the prior art: generally, there are a relatively large quantity of controls disposed in a shortcut menu, and a display style and a control manner of the controls in the shortcut menu are relatively single, resulting in poor convenience of using the controls in the shortcut menu.

SUMMARY

An objective of embodiments of this application is to provide a menu display method and apparatus, an electronic device, and a storage medium.

According to a first aspect, an embodiment of this application provides a menu display method, including the following steps:
  receiving a first input that is performed on N first controls in a shortcut menu by a user, where N is a positive integer;
  in a case that N is equal to 1, updating a display status of the first control from a first display size to a second display size in response to the first input, where the first display size is less than the second display size; and
  in a case that N is greater than 1, merging the N first controls into M second controls in response to the first input; where
  each second control is obtained by merging at least two first controls, M is a positive integer, and M is less than N.

According to a second aspect, an embodiment of this application provides a menu display apparatus, including:
  a first receiving module, configured to receive a first input that is performed on N first controls in a shortcut menu by a user, where N is a positive integer;
  an updating module, configured to: in a case that N is equal to 1, update a display status of the first control from a first display size to a second display size in response to the first input, where the first display size is less than the second display size; and
  a merging module, configured to: in a case that N is greater than 1, merge the N first controls into M second controls in response to the first input; where
  each second control is obtained by merging at least two first controls, M is a positive integer, and M is less than N.

According to a third aspect, an embodiment of this application provides an electronic device. The electronic device includes a processor, a memory, and a program or an instruction that is stored in the memory and that can run on the processor, and when the program or the instruction is executed by the processor, steps in the method described in the first aspect are implemented.

According to a fourth aspect, an embodiment of this application provides a readable storage medium. The readable storage medium stores a program or an instruction, and when the program or the instruction is executed by the processor, steps in the method described in the first aspect are implemented.

According to a fifth aspect, an embodiment of this application provides a chip, where the chip includes a processor and a communications interface, the communications interface is coupled to the processor, and the processor is configured to run a program or an instruction to implement steps in the method described in the first aspect.

According to a sixth aspect, a computer program product is provided. The program product is stored in a non-volatile storage medium, and the program is executed by at least one processor to implement steps in the method described in the first aspect.

According to a seventh aspect, an embodiment of this application provides an electronic device. The electronic device is configured to perform steps in the method described in the first aspect.

In the embodiments of this application, a first input that is performed on N first controls in a shortcut menu by a user is received, where N is a positive integer; in a case that N is equal to 1, a display status of the first control is updated from a first display size to a second display size in response to the first input, where the first display size is less than the second display size; and in a case that N is greater than 1, the N first controls are merged into M second controls in response to the first input, where each second control is obtained by merging at least two first controls, M is a positive integer, and M is less than N. In this way, in this embodiment of this application, a display size of the first control is enlarged from the first display size to the second display size, so that a display effect of the first control is more prominent, and a user can find the first control more quickly, and searching efficiency of the user for the first control is improved. Multiple first controls are merged into one second control, so that the multiple first controls can be bound, and therefore the user simultaneously controls, by controlling one second control, functions corresponding to the multiple first controls, which help simplify a control process and improve operation efficiency.

BRIEF DESCRIPTION OF DRAWINGS

To describe the technical solutions of the embodiments of this application more clearly, the following briefly describes the accompanying drawings required for describing the embodiments of this application. Apparently, the accompanying drawings in the following description show merely some embodiments of this application, and a person of ordinary skill in the art may still derive other drawings from these accompanying drawings without creative efforts.

FIG. 1 is a flowchart of a menu display method according to an embodiment of this application.

DETAILED DESCRIPTION

The following describes the technical solutions in the embodiments of this application with reference to the accompanying drawings in the embodiments of this application. Apparently, the described embodiments are some rather than all of the embodiments of this application. Based on the embodiments of this application, all other embodiments obtained by a person of ordinary skill in the art without creative efforts shall fall within the protection scope of this application.

Terms "first", "second", and the like in the specification and claims of this application are used to distinguish between similar objects, and do not need to be used to describe a specific order or sequence. It should be understood that data used in this way may be interchangeable in appropriate cases, so that the embodiments of this application can be implemented in a sequence other than those shown or described herein. In addition, in the specification and the claims, "and/or" represents at least one of connected objects, and the character "/" generally represents an "or" relationship between associated objects.

A menu display method provided in the embodiments of this application is described in detail below with reference to the accompanying drawings by using specific embodiments and application scenarios thereof.

Figure 1:
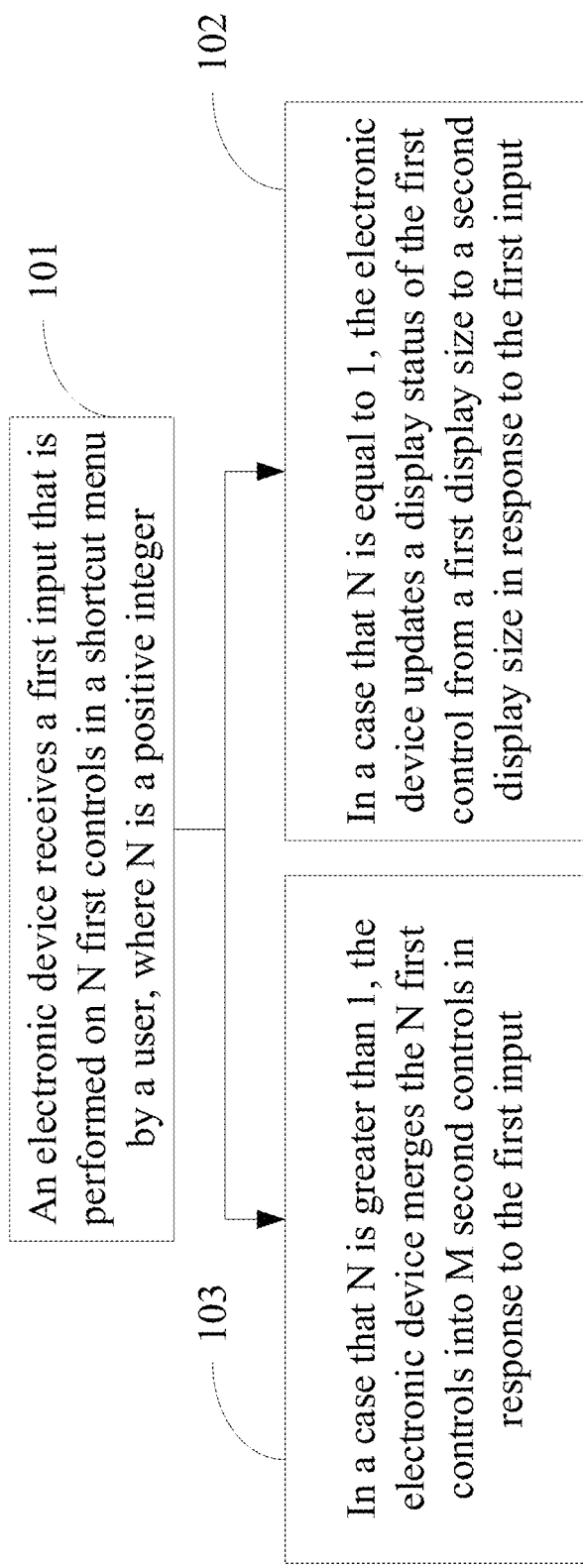

FIG. 1 is a flowchart of a menu display method according to an embodiment of this application. As shown in FIG. 1, the method includes the following steps:

Step 101: An electronic device receives a first input that is performed on N first controls in a shortcut menu by a user, where N is a positive integer.

In this embodiment of this application, the foregoing shortcut menu may be understood as a shortcut menu of a control center. The control center may also be referred to as a shortcut center, and a display interface of the control center may be understood as an interface providing a shortcut menu entry for the electronic device.

Figure 2:
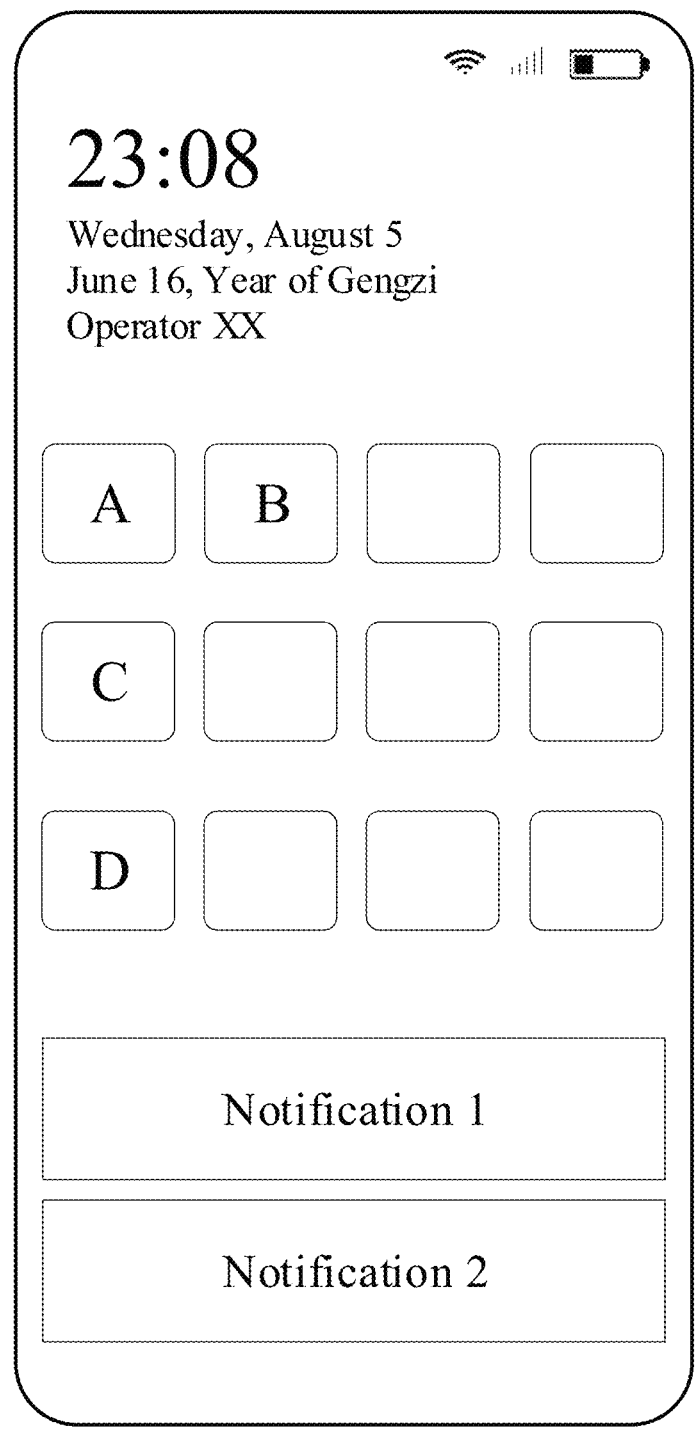
FIG. 2 is a first interface diagram of an electronic device in a menu display method according to an embodiment of this application.

The display interface of the control center may be an interface shown in FIG. 2. Generally, in a case of displaying a desktop of a system, the shortcut menu of the control center may be displayed in an up-slide menu by using an up-slide operation, the shortcut menu of the control center may be displayed in a pull-down menu by using a down-slide operation, or the shortcut menu of the control center may be directly displayed on a hiboard or another interface.

The first control may include an icon control and a function control. The shortcut menu may generally include multiple first controls. Each first control is used to provide a shortcut operation entry of an application. Operation control may be implemented, by using the first input that is performed on the first control by the user, on an application corresponding to the first control. For example, the corresponding application may be enabled or disabled, or a function of the corresponding application may be controlled to be enabled or disabled, or a parameter of the application may be adjusted. A control A, a control B, a control C, and a control D that are shown in FIG. 2 separately represent different first controls. Different first controls may correspond to different applications, or multiple first controls may correspond to a same application.

The first controls may include but are not limited to a wireless local area network enabling and disabling control, a mobile data network enabling and disabling control, and a Bluetooth function enabling and disabling control of a Bluetooth application.

In some embodiments, only these first controls may be displayed in the control center. As shown in FIG. 2, in some other embodiments, the control center is further configured to display some other information, such as a notification message. In other words, some or all areas of the control center may be used to display these first controls. In this embodiment, an area in which these shortcut menus are displayed is defined as a target area.

The first input may be a voice input, a gesture input, or the like. The first input may include a triggering operation of triggering entry into an edition mode of the first control. For example, the first input may include: entering the edition mode of the first control by using an operation edit button, or may be: entering the edition mode by using a specific operation such as touch and hold and double-finger zooming, or may be: entering the edition mode in a voice control manner.

Step 102: In a case that N is equal to 1, the electronic device updates a display status of the first control from a first display size to a second display size in response to the first input, where the first display size is less than the second display size.

In an embodiment, the first input may further include a dragging input, to further control a display size of the first control by using the dragging input after entering the edition mode.

As shown in FIG. 2 to FIG. 13, in a specific implementation of this embodiment, the target area of the control center is a 3-row and 4-column area, and a total of 12 first controls of a default size are displayed in the area, in other words, the first control whose display status is the first display size. In this embodiment, an area occupied by each first control of the default size is defined as one unit. When the display size of the first control is adjusted, the display size of the first control may be adjusted to different sizes such as 2, 3, 4, 6, . . . , 16 units.

Figure 3:
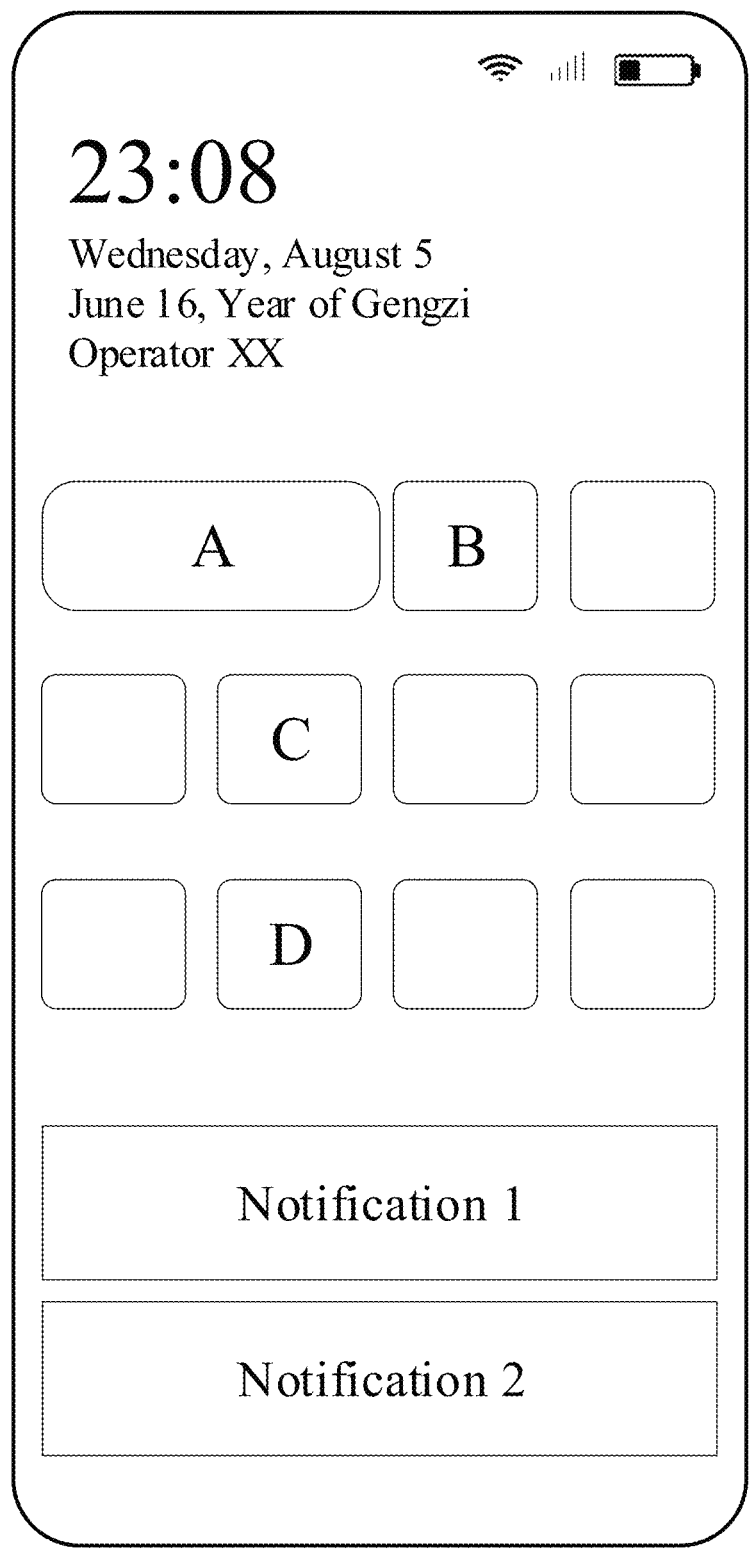
FIG. 3 is a second interface diagram of an electronic device in a menu display method according to an embodiment of this application.
Figure 4:
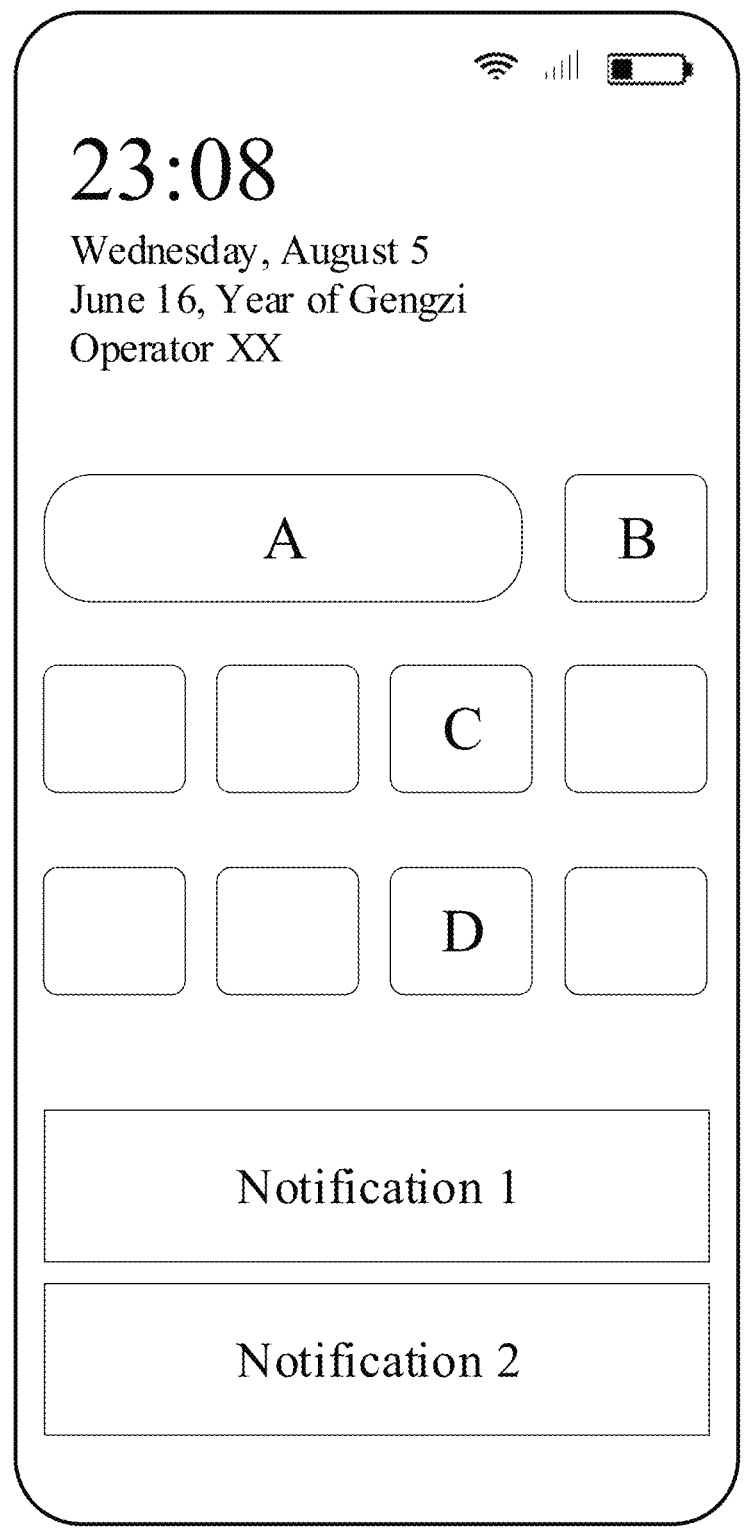
FIG. 4 is a third interface diagram of an electronic device in a menu display method according to an embodiment of this application.
Figure 5:
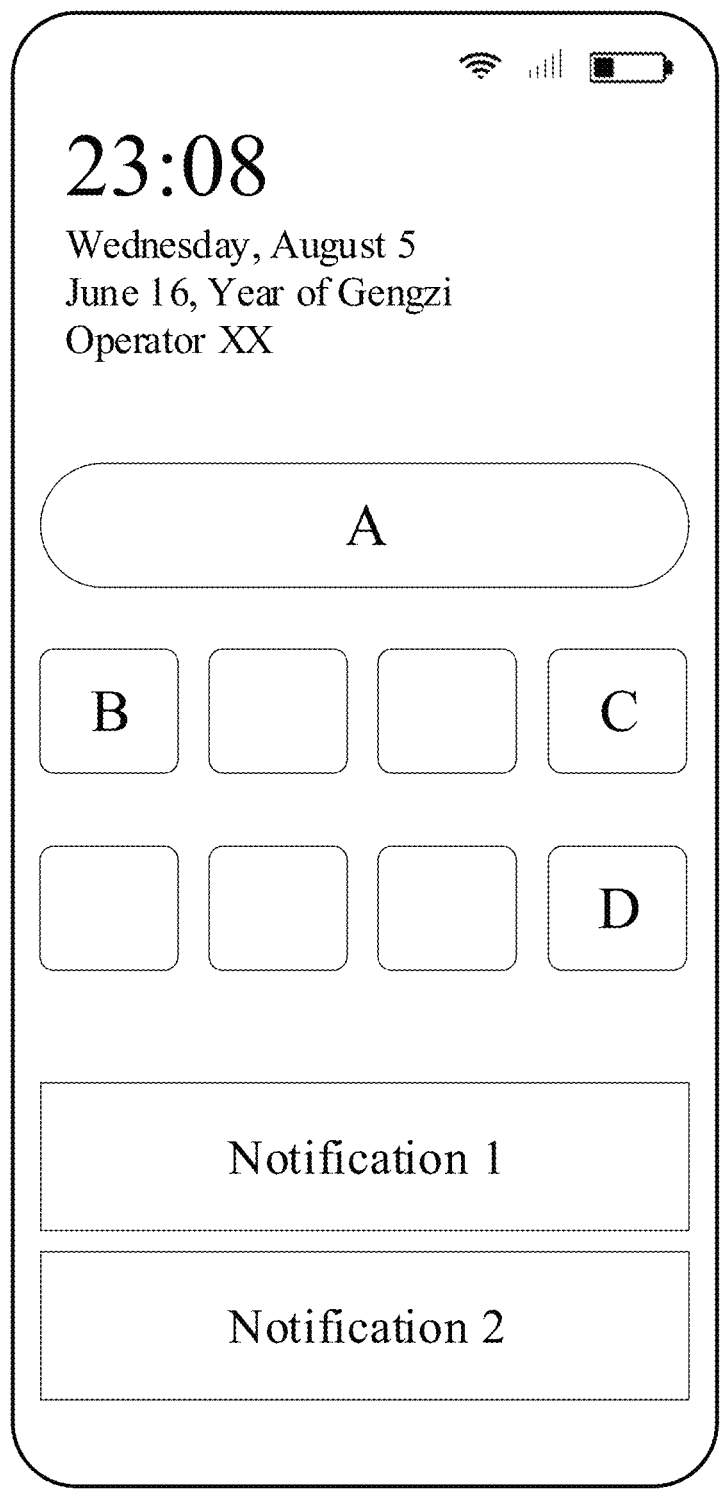
FIG. 5 is a fourth interface diagram of an electronic device in a menu display method according to an embodiment of this application.
Figure 6:
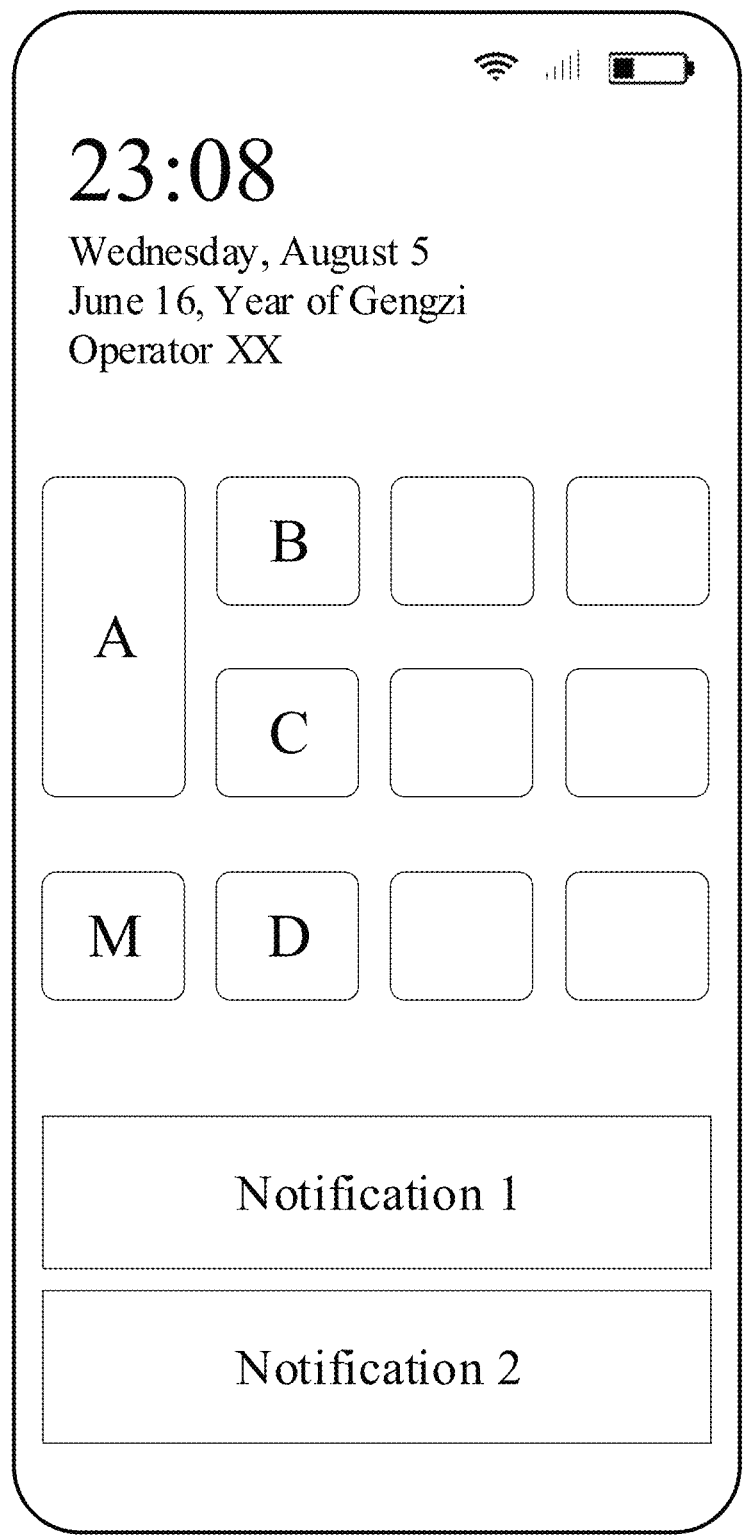
FIG. 6 is a fifth interface diagram of an electronic device in a menu display method according to an embodiment of this application.
Figure 7:
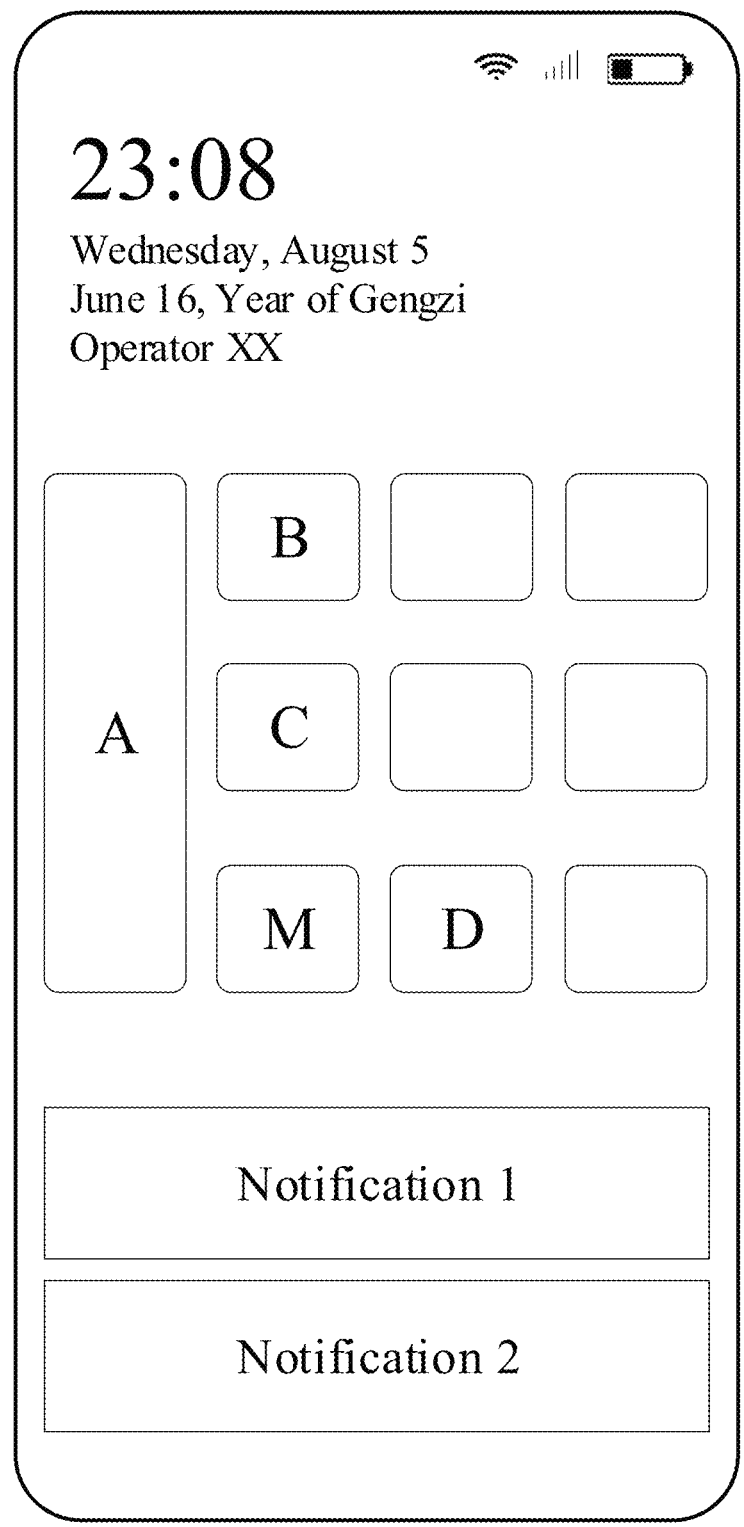
FIG. 7 is a sixth interface diagram of an electronic device in a menu display method according to an embodiment of this application.
Figure 8:
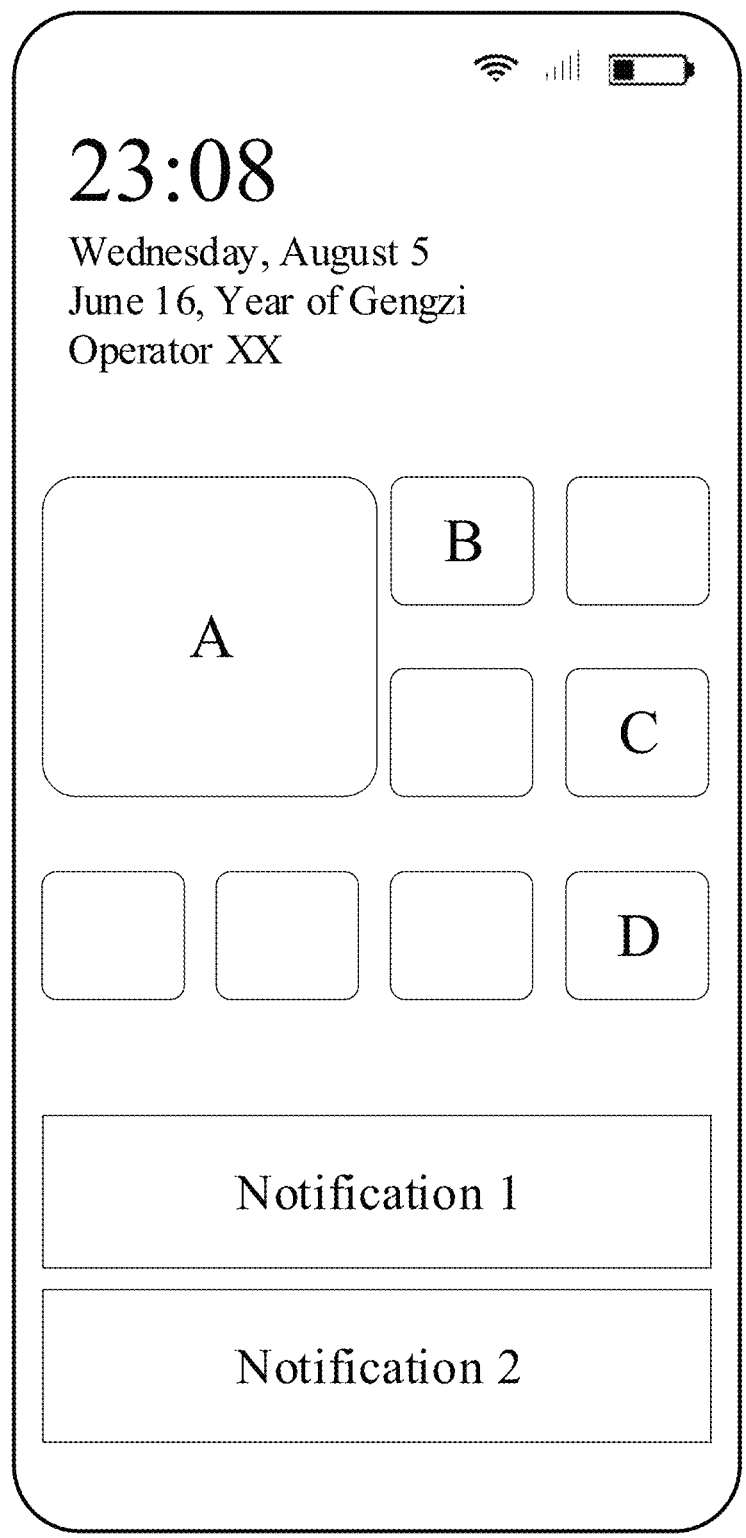
FIG. 8 is a seventh interface diagram of an electronic device in a menu display method according to an embodiment of this application.
Figure 9:
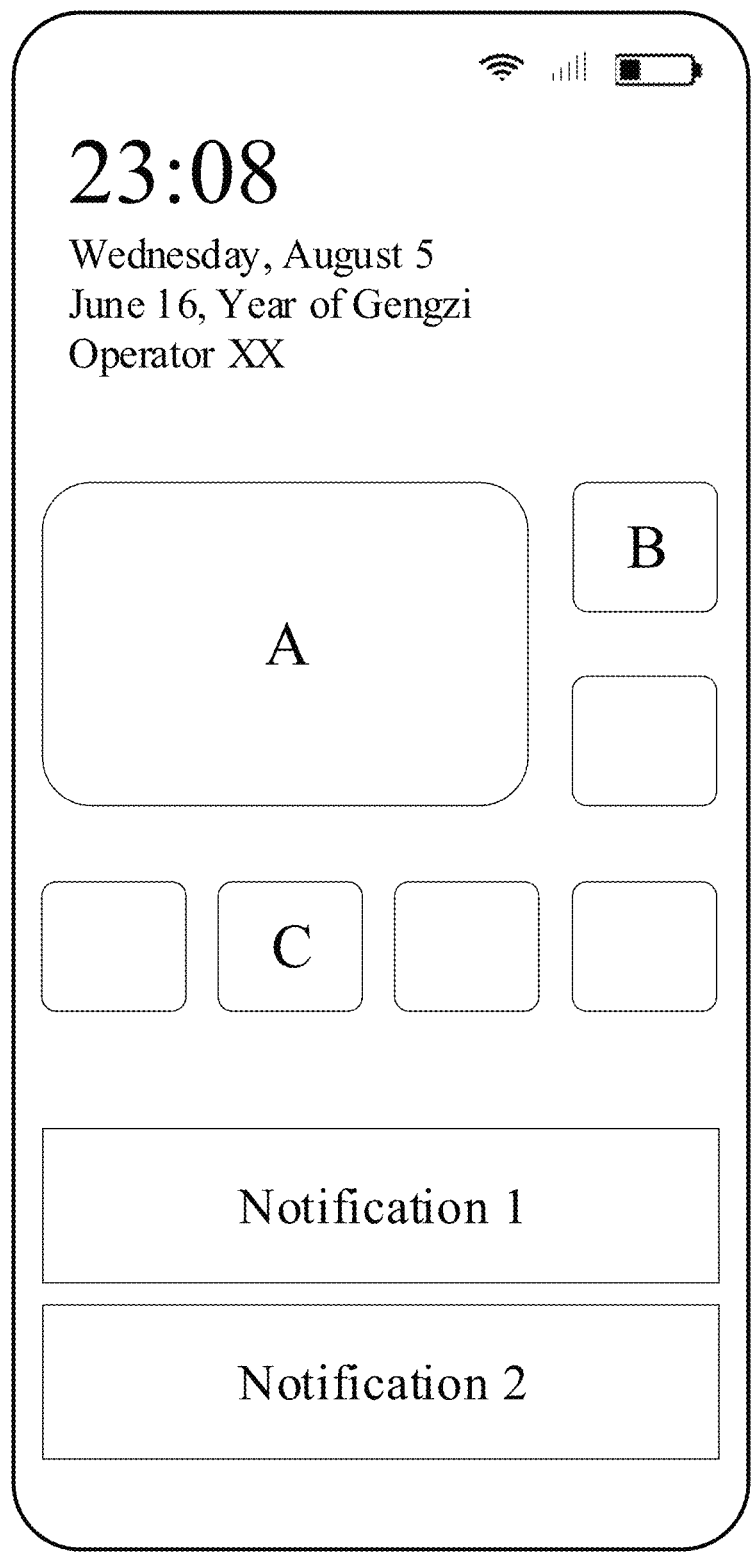
FIG. 9 is an eighth interface diagram of an electronic device in a menu display method according to an embodiment of this application.
Figure 10:
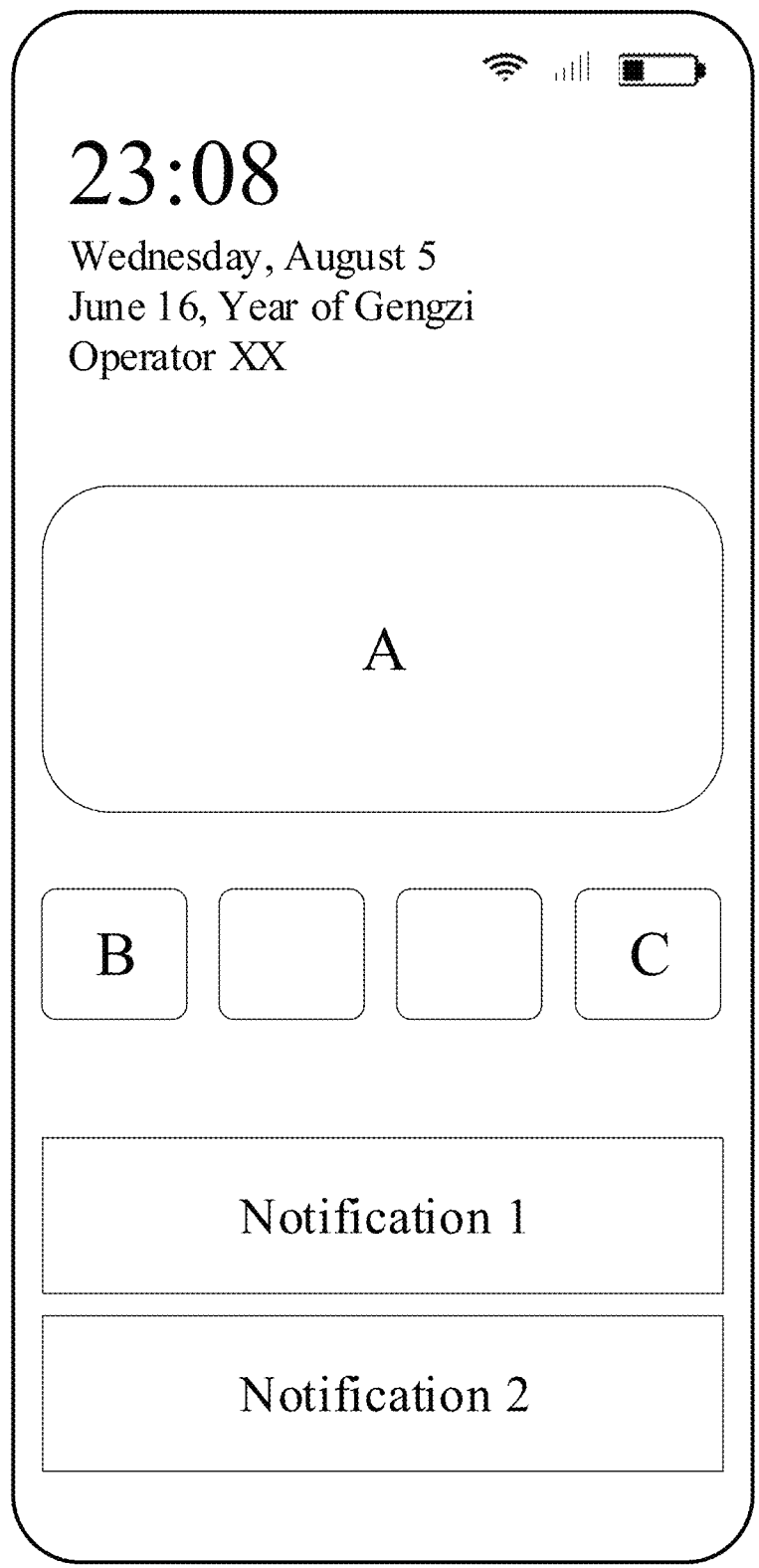
FIG. 10 is a ninth interface diagram of an electronic device in a menu display method according to an embodiment of this application.
Figure 11:
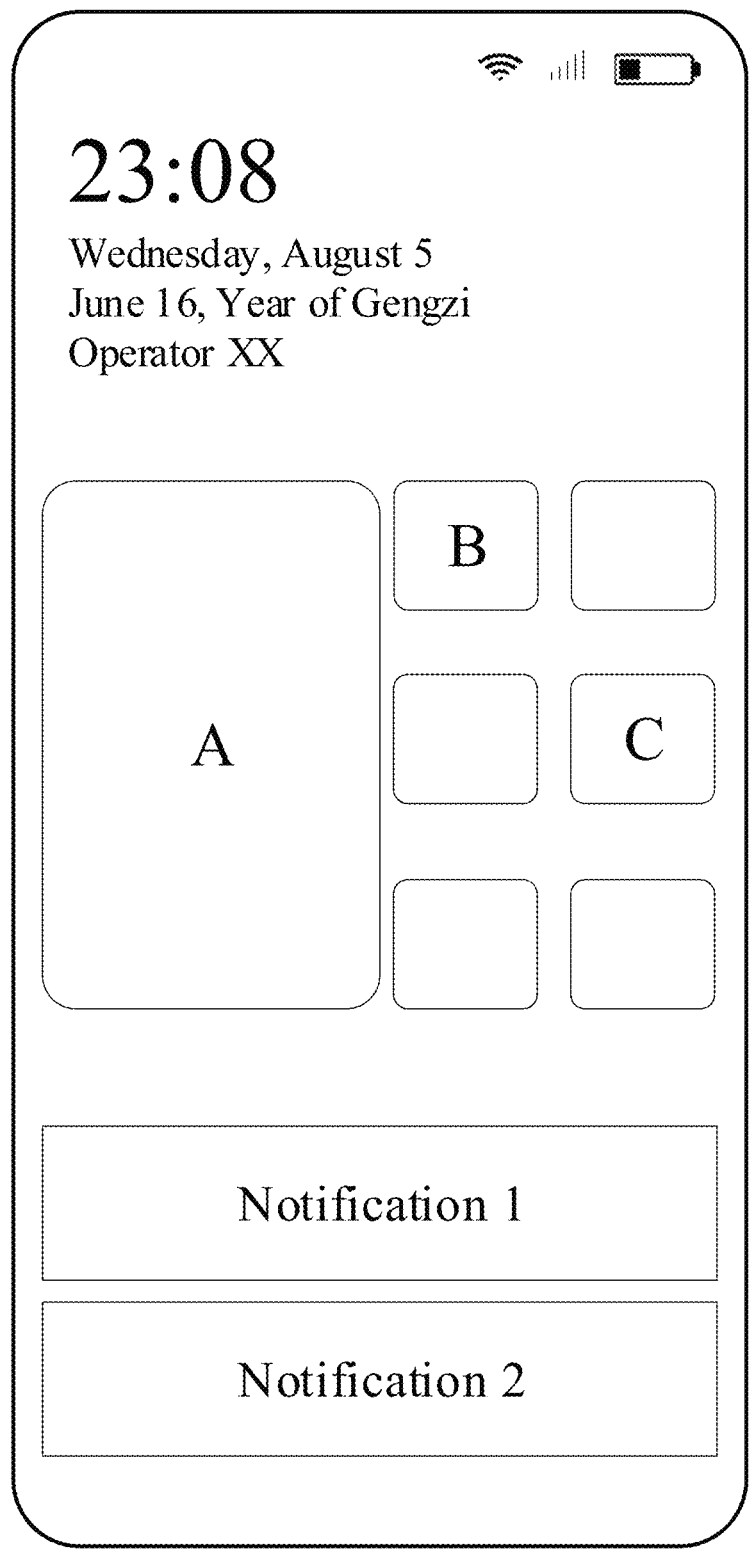
FIG. 11 is a tenth interface diagram of an electronic device in a menu display method according to an embodiment of this application.
Figure 12:
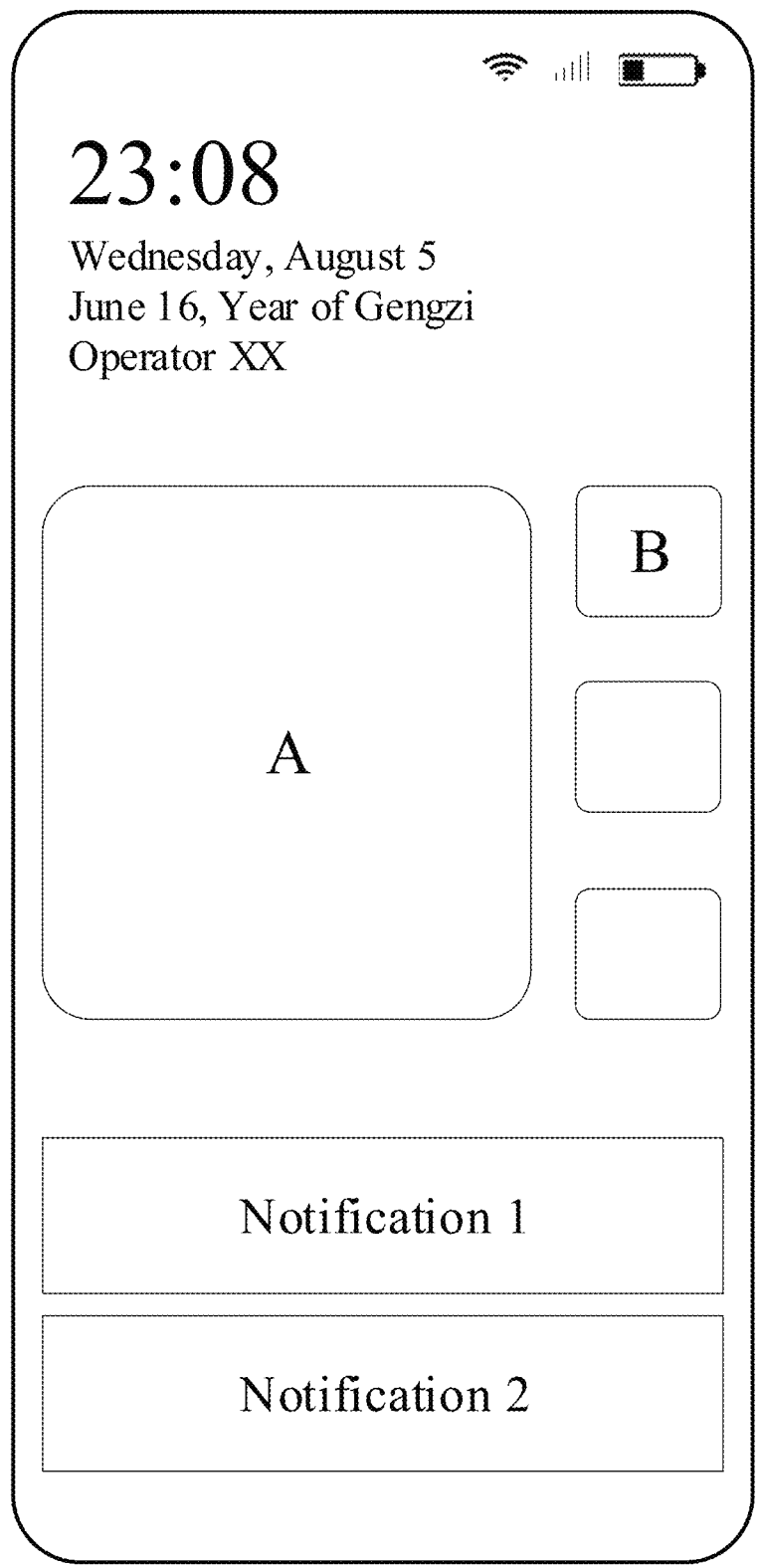
FIG. 12 is an eleventh interface diagram of an electronic device in a menu display method according to an embodiment of this application.
Figure 13:
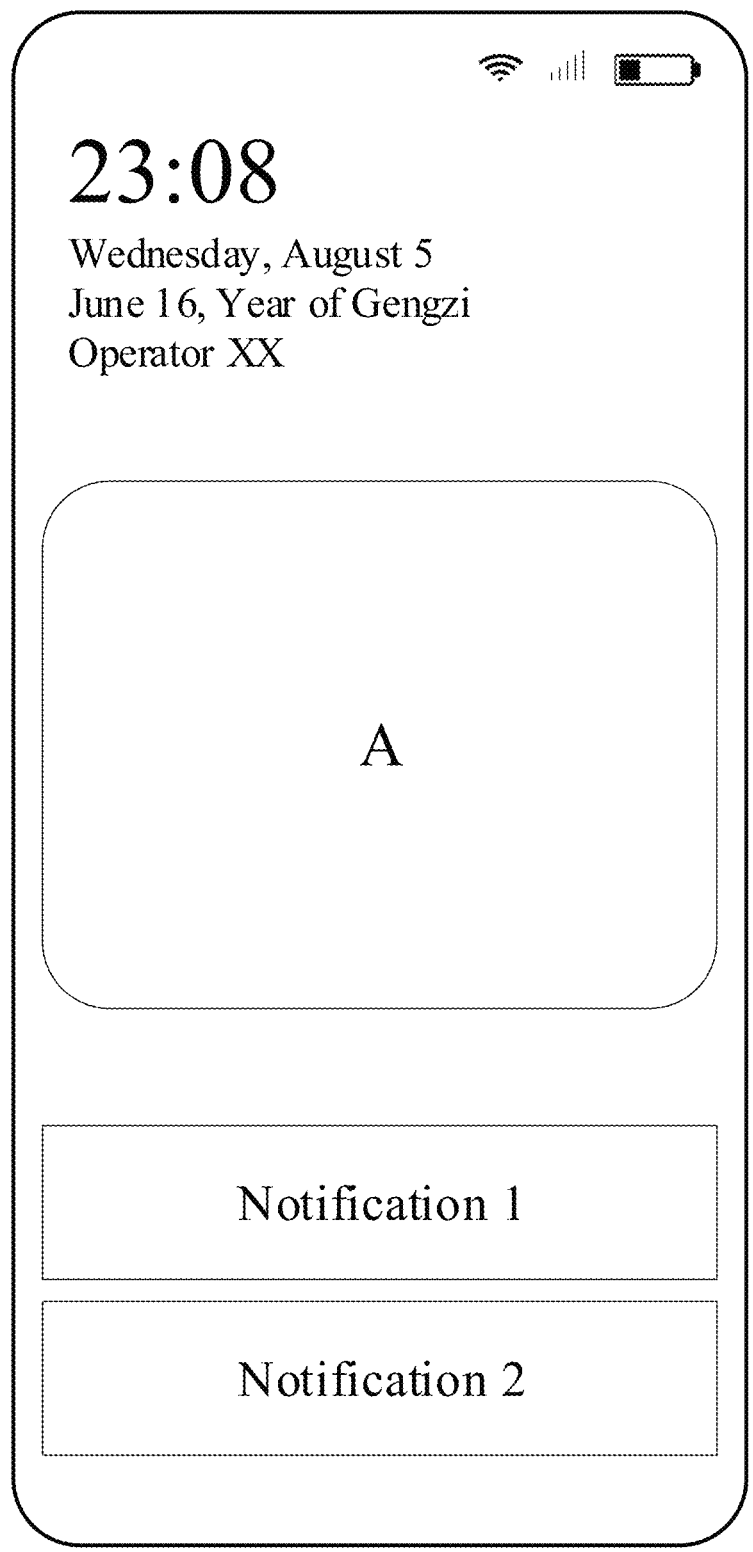
FIG. 13 is a twelfth interface diagram of an electronic device in a menu display method according to an embodiment of this application.

For example, a display status of each first control in FIG. 2 is a default state, and a horizontal dimension of the control A is adjusted in FIG. 3 to FIG. 5, and a vertical dimension of the control A is adjusted in FIG. 6 and FIG. 7. In FIG. 8 to FIG. 13, both the horizontal dimension and the vertical dimension of the control A are adjusted.

It should be understood that, because an area of a target area for displaying the first control in the control center is fixed, and the first control cannot exceed the range of the target area, the display size of the first control is less than or equal to a size of the target area.

Further, in this embodiment, if the display size of the first control is adjusted, a remaining area of the target area is changed, and the quantity of first controls that can be displayed in the target area is also changed.

For example, if a display size of one first control is enlarged, the remaining area of the target area decreases, and the quantity of first controls that can be displayed decreases, and if a display size of one first control is reduced, the remaining area of the target area increases, and the quantity of first controls that can be displayed increases.

In this embodiment, the quantity of first controls is further determined based on the size of the first control and the size of the target area.

As shown in FIG. 2, the target area may contain three rows and four columns, that is, a total of 12 first controls of the first display size. As shown in FIG. 3, when a display size of the control A is adjusted to the second display size, the control A occupies a display area corresponding to two first controls of the first display size, and a remaining area of the target area can further accommodate ten first controls of the first display size. Therefore, the ten first controls of the first display size are sequentially arranged in remaining space of the target area. The display size of the first control is enlarged from the first display size to the second display size, so that a display effect of the first control can be more prominent, and a user can find the first control more quickly, and searching efficiency of the user for the first control is improved.

Step 103: In a case that N is greater than 1, the electronic device merges the N first controls into M second controls in response to the first input.

In an embodiment, the first input further includes a selection operation on the first control. For example, the N first controls may be selected in a manner of tapping the first control, dragging the first control to a specified area, and continuously sliding on the first control.

In this embodiment, each second control is obtained by merging at least two first controls, M is a positive integer, and M is less than N.

Figure 14:
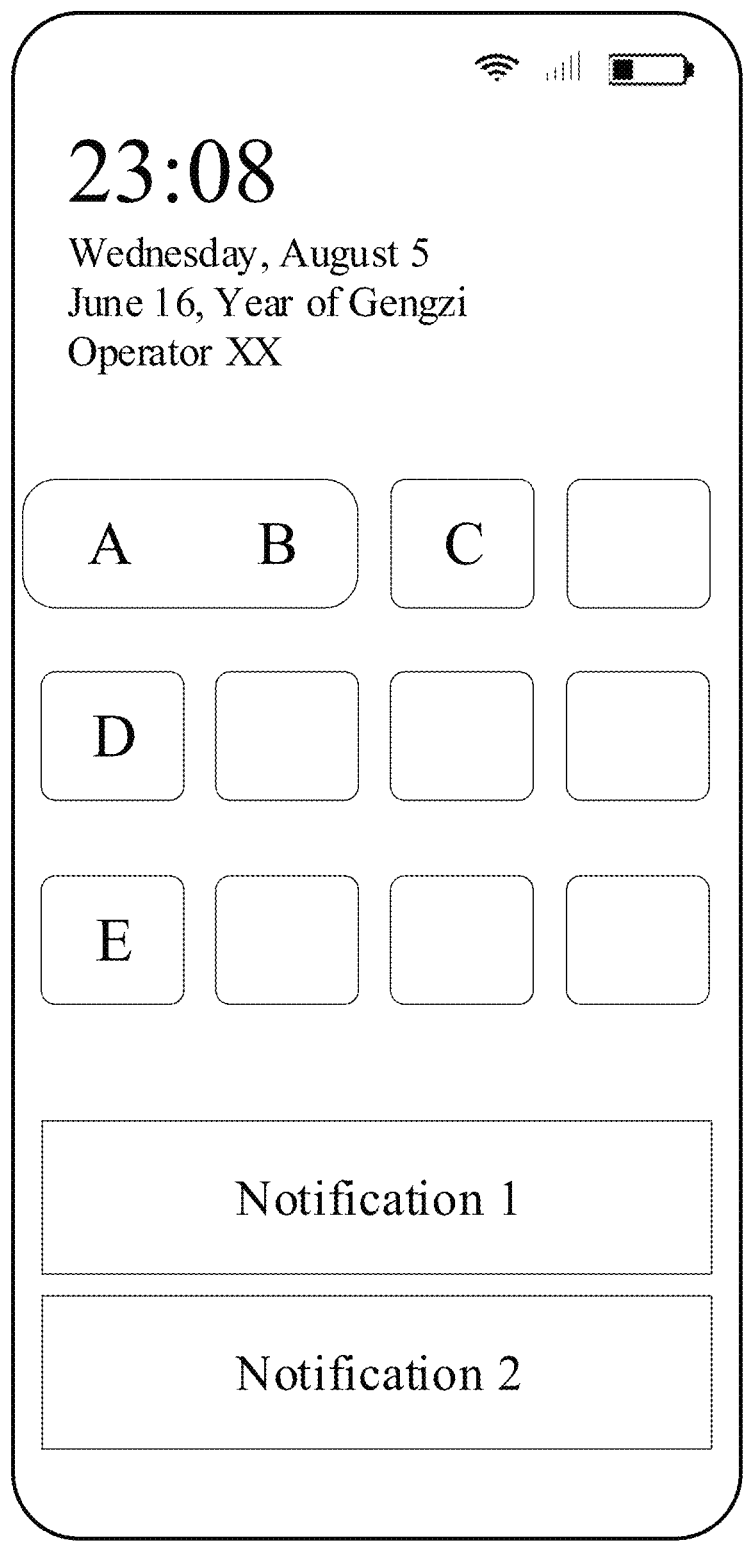
FIG. 14 is a thirteenth interface diagram of an electronic device in a menu display method according to an embodiment of this application.
Figure 15:
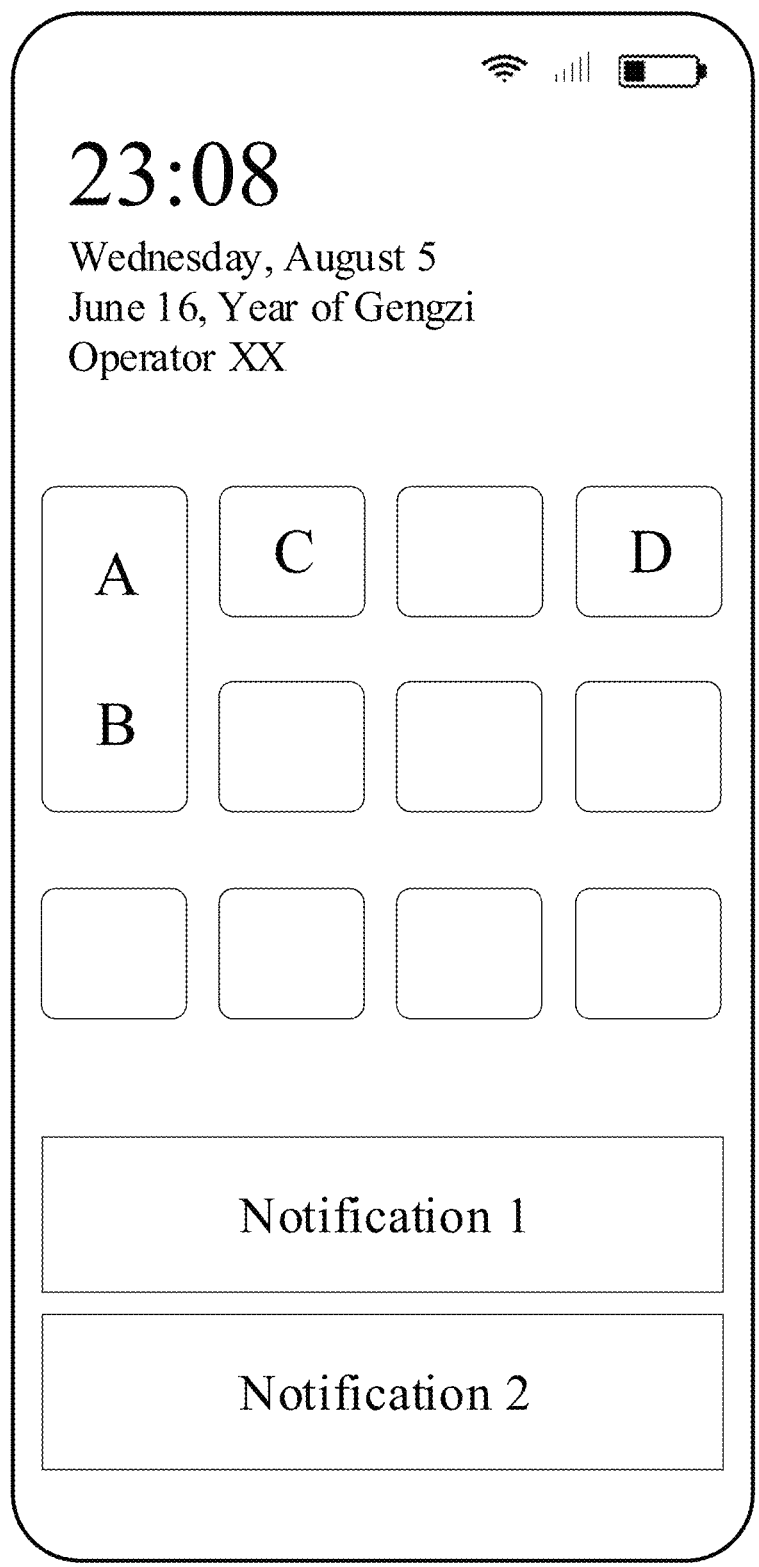
FIG. 15 is a fourteenth interface diagram of an electronic device in a menu display method according to an embodiment of this application.

As shown in FIG. 14 and FIG. 15, in an embodiment, there are two first controls. During implementation, if a first input that is performed on the selected control A and the control B is detected, the two first controls are merged into one second control.

Figure 16:
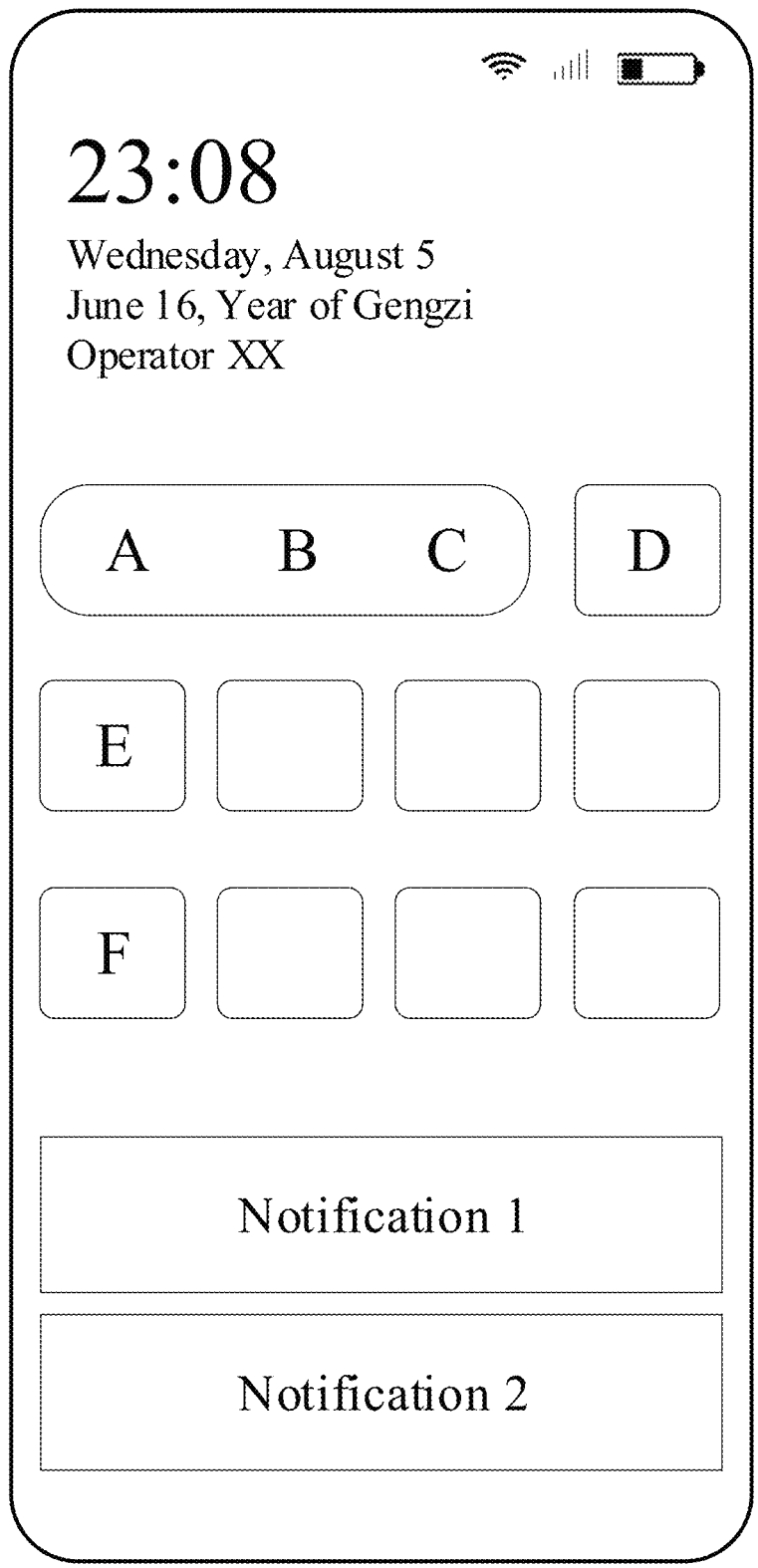
FIG. 16 is a fifteenth interface diagram of an electronic device in a menu display method according to an embodiment of this application.
Figure 17:
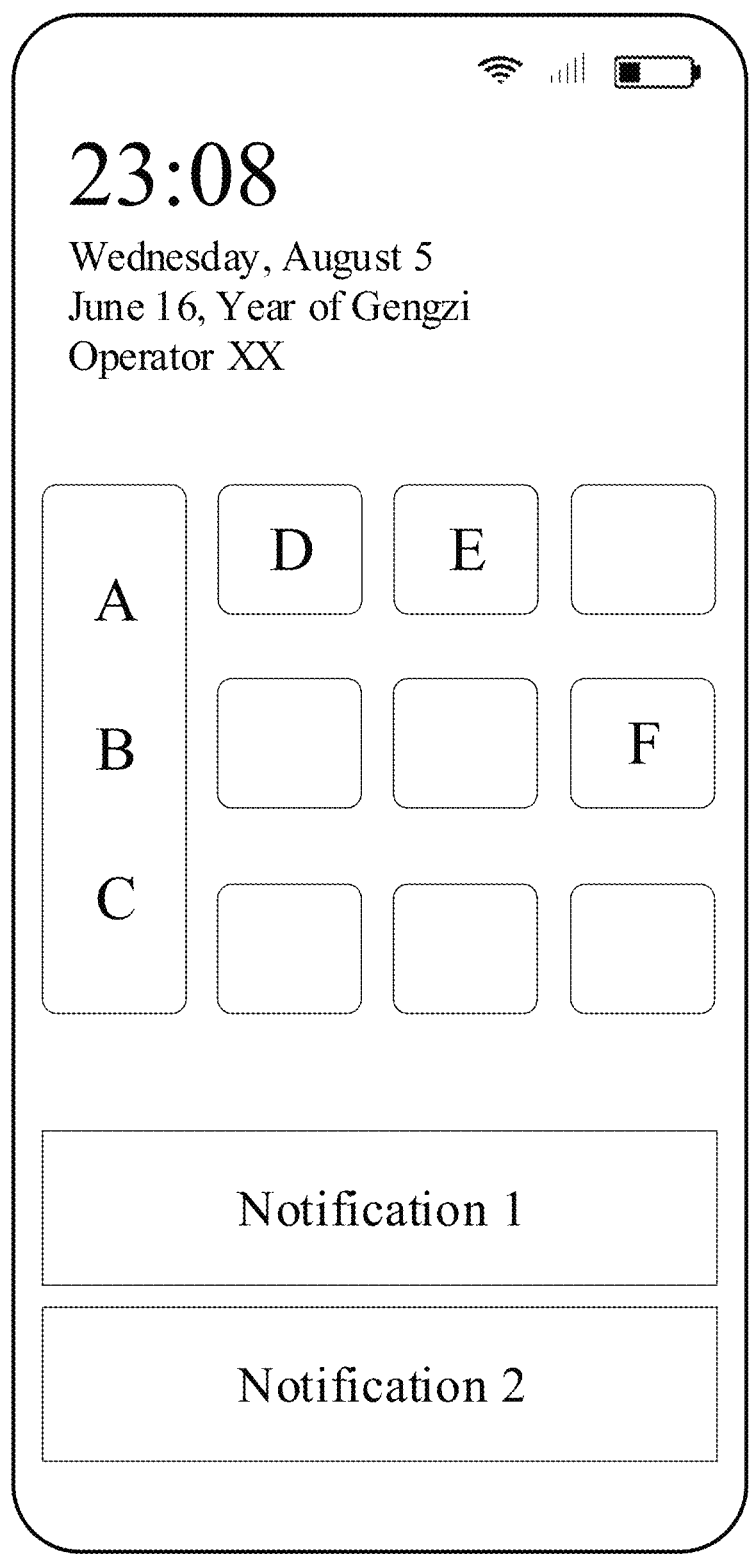
FIG. 17 is a sixteenth interface diagram of an electronic device in a menu display method according to an embodiment of this application.

The quantity of first controls merged into one second control may be adjusted. As shown in FIG. 16 and FIG. 17, in another embodiment, there may be three first controls.

Apparently, the quantity of first controls may alternatively be set to four or more. This is not further limited and described in this embodiment.

Further, the quantity of second controls obtained through combination is not limited to one. For example, in an embodiment, a combination operation is performed on five first controls. During implementation, three first controls are merged into one second control, and the other two first controls are merged into another second control. This process may be implemented by using two independent combination operations, or may be implemented in one operation. In this way, multiple first controls are merged into one second control, so that the multiple first controls can be bound, and the user can simultaneously control, by controlling one second control, functions corresponding to the multiple first controls, which helps simplify a control process and improve operation efficiency.

In this embodiment of this application, the display size of the first control is enlarged from the first display size to the second display size, so that the user can find the first control more quickly. The multiple first controls are merged into one second control, so that the functions corresponding to the multiple first controls can be simultaneously controlled. Therefore, this embodiment of this application improves convenience of using the control in the shortcut menu.

In some embodiments, in a case that N is greater than 1, after the electronic device merges the N first controls into M second controls in response to the first input, the method further includes:

the electronic device receives a second input that is performed on a first target control in the M second controls by the user; and the electronic device splits the first target control into T first controls in response to the second input; where T is an integer greater than 1.

In this embodiment, the second input may be a voice input or a gesture input. For example, in an embodiment, the second input may be a sliding input that two fingers are separated on the first target control.

Figure 18:
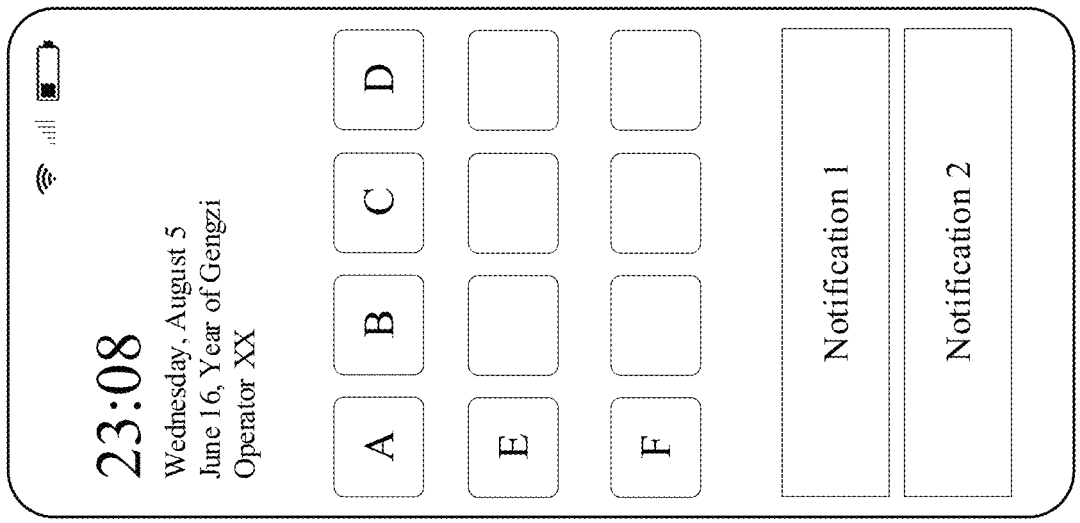
FIG. 18 is a seventeenth interface diagram of an electronic device in a menu display method according to an embodiment of this application.
Figure 18:
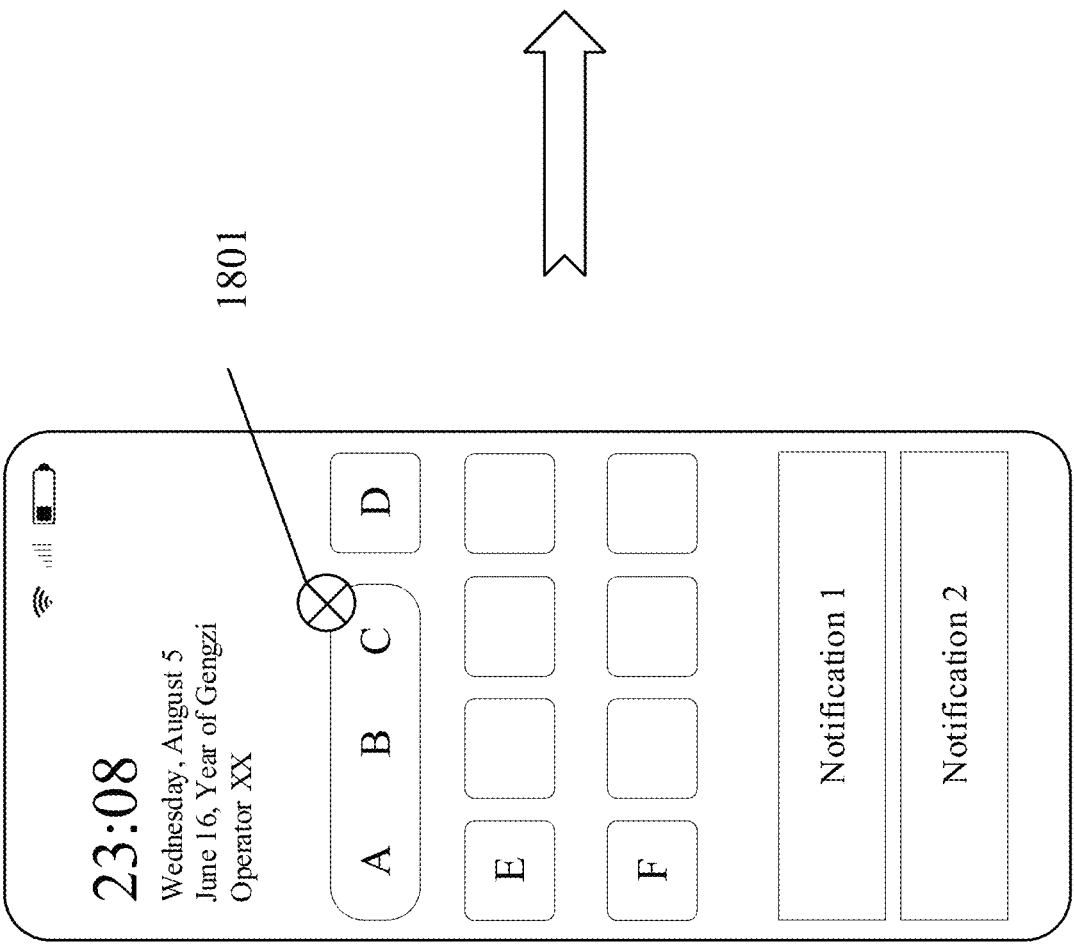

As shown in FIG. 18, in another embodiment, a split control 1801 may be correspondingly displayed for each second control. In this case, the second input may be understood as an input of tapping or double tapping on the split control 1801.

In still another embodiment, the display interface in the control center may further include a splitting area, and the second input may further be an input of dragging the first target control to the splitting area.

In the following embodiment, as an example for description, the second input is an input of tapping or double tapping the splitting control 1801. As shown in FIG. 18, the control center includes one second control, that is, a control ABC obtained by merging the control A, the control B, and the control C. A splitting control 1801 corresponding to the second control is displayed in an upper right corner of the control ABC. The splitting control 1801 may be always displayed, or may be displayed in a specific state. For example, the splitting control 1801 is displayed after entering the edition mode. The user may tap the splitting control 1801 to split the second control, to separately display the control A, the control B, and the control C.

In this embodiment of this application, the second control may be split by using the second input, so that the user may choose to split the second control according to a requirement, thereby improving operation flexibility.

In an embodiment, in a case that N is equal to 1, after the electronic device updates the display status of the first control from the first display size to the second display size in response to the first input, the method further includes:
the electronic device receives a third input that is performed on the first control with a second display size by the user; and
the electronic device updates the display status of the first control from the second display size to the first display size in response to the third input.

In this embodiment of this application, the third input may be a voice input or a gesture input. For example, in an embodiment, the third input may be a sliding input that two fingers are separated on the first target control or a double tapping input.

In this embodiment, a restoration control corresponding to the first control whose display status changes may be further displayed on the electronic device, and an operation input that is performed on the restoration control by the user is used as the third input to restore the display status of the first control.

Figure 19:
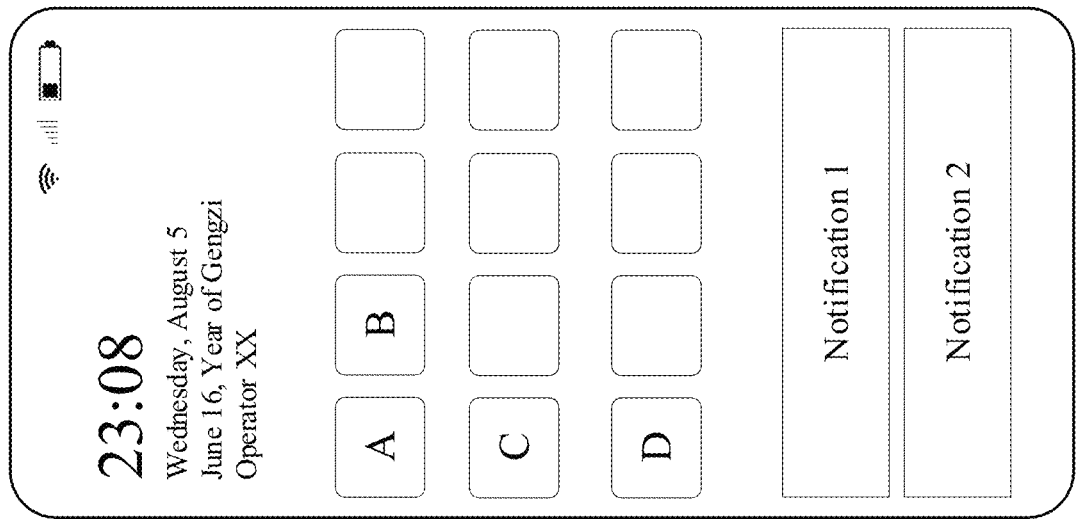
FIG. 19 is an eighteenth interface diagram of an electronic device in a menu display method according to an embodiment of this application.
Figure 19:
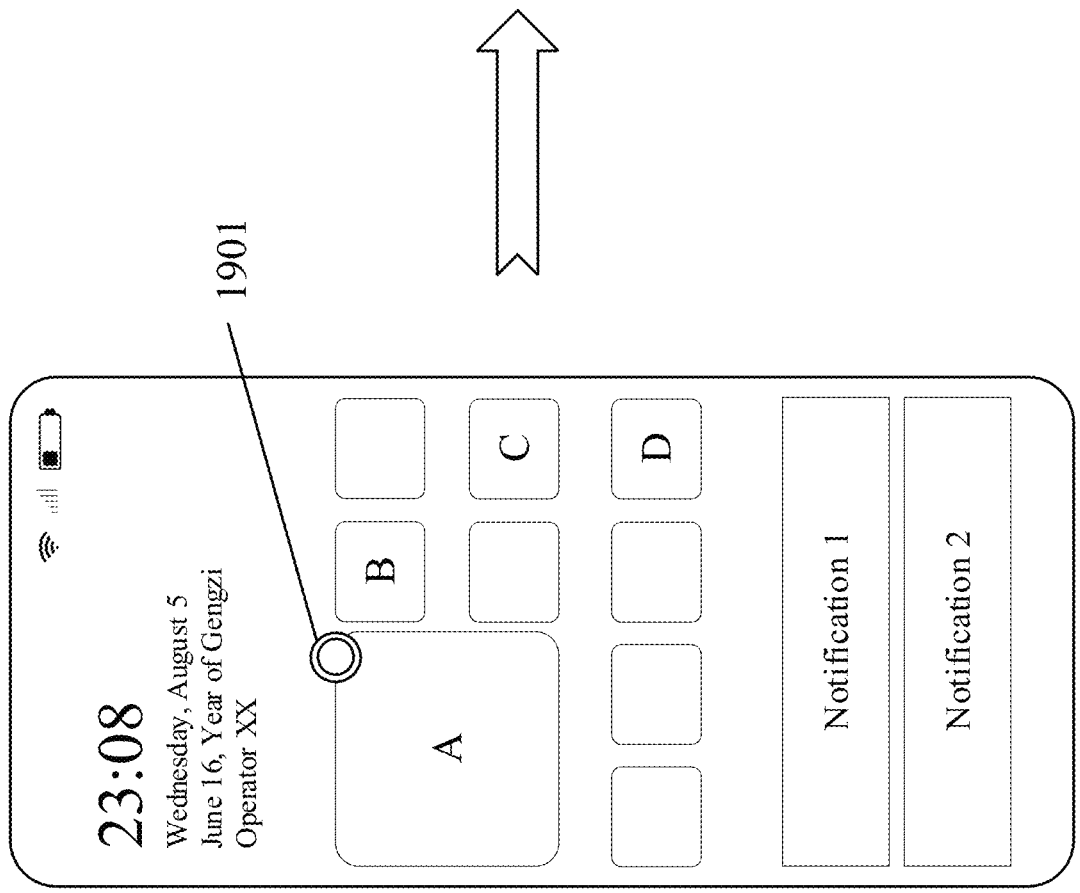

As shown in FIG. 19, in another embodiment, a restoration control 1901 may be correspondingly displayed for each second control. In this case, the third input may be understood as an input of tapping or double tapping the restoring control 1901.

In still another embodiment, the display interface in the control center may further include a restoration area, and the second input may further be an input of dragging the first target control to the restoration area.

In the following embodiment, as an example for description, the third input is an input of tapping or double tapping the restoration control. As shown in FIG. 19, the control center includes a first control in a second display status, that is, a control A, and a restoration control 1901 corresponding to the first control in the second display status is displayed in an upper right corner of the control A, that is, a concentric circular control in the figure. The restoration control 1901 may be always displayed, or may be displayed in a specific state, for example, displayed in a case of entering the foregoing edition mode.

After tapping the restoration control 1901, the user may restore the control A to the first display status.

In this embodiment of this application, the first control in the second display status may be restored by using the third input, so that the first control in the second display status may be quickly adjusted to the first display status according to a requirement, thereby improving display flexibility of the control.

In some embodiments, in a case that N is greater than 1, after the electronic device merges the N first controls into M second controls in response to the first input, the method further includes:
the electronic device receives a fourth input that is performed on a second target control in the M second controls by the user, where the second target control is obtained by merging T first controls; and
the electronic device performs, in response to the fourth input, target processing on T applications indicated by the T first controls.

In this embodiment, the second input may be a voice input or a gesture input. In an embodiment, the fourth input is a gesture input that is performed on the second control by the user.

As shown in FIG. 14, for example, the second target control is obtained by merging two first controls: the first control A and the first control B. When receiving the fourth input that is performed on the second target control by the user, in response to the fourth input, the electronic device simultaneously controls applications indicated by the first control A and the first control B, so that multiple application programs can be controlled by using one operation.

In the technical solution of this embodiment, the multiple first controls are controlled in response to the fourth input of the second target control, and the user may set, according to a requirement, a second control that is associated with different functions, and control the second control, to control multiple applications by performing one operation. This helps simplify an operation process and improve control efficiency of controlling the application.

In some embodiments, that the electronic device performs, in response to the fourth input, target processing on T applications indicated by the T first controls includes:
the electronic device obtains an input feature of the fourth input; and
the electronic device performs target processing associated with the input feature on the T applications indicated by the T first controls.

The input feature of the fourth input in this embodiment may refer to different operation manners. For example, the input feature may include but is not limited to different specific input features such as a tapping operation, a double tapping operation, a touch and hold operation, and a sliding operation.

For different input features, different target processing manners are further set in this embodiment. The target processing may be different processing manners such as an enabling operation and a disabling operation.

In an embodiment, the target processing includes disabling a specified function of the T applications indicated by the T first controls.

Different processing manners of the first control associated with the second target control can be implemented by setting different input features of the fourth input and target processing associated with the input feature, so that convenient control of different processing manners of the multiple applications associated with the first control constituting the second control can be implemented by using one second control, thereby improving operation convenience.

In some embodiments, that the electronic device performs target processing associated with the input feature on the T applications indicated by the T first controls includes:

in a case that the input feature is a preset first feature, the electronic device enables or disables, in an association manner, the T applications indicated by the T first controls;

in a case that the input feature is a preset second feature, the electronic device enables or disables, in a preset sequence, the T applications indicated by the T first controls; and in a case that the input feature is a preset third feature, switches program functions of the T applications indicated by the T first controls.

In the technical solution of this embodiment, the first feature, the second feature, and the third feature may be different preset operation gestures, for example, may be different operations such as a tapping operation, a double tapping operation, or sliding operations in different directions of the second control.

In this embodiment, as an example for further descriptions, the first feature is a tapping operation, the second feature is a sliding operation, and the third feature is a double tapping operation.

It should be understood that the application in this embodiment includes not only an application in a general sense, but also may refer to an operating system. In other words, a target operation performed for the application may refer to adjusting some specific functions provided by the operating system, for example, enabling and disabling a wireless local area network, a mobile data traffic switch, and a Bluetooth function of a Bluetooth module included in the operating system.

In an embodiment, the two first controls associated with the second target control are respectively a wireless local area network switch and a mobile data traffic switch. When a tapping operation of the user on the second target control is received, the wireless local area network switch and the mobile data traffic switch are simultaneously enabled, and when the tapping operation of the user on the second target control is received again, the wireless local area network switch and the mobile data traffic switch are simultaneously disabled.

If the two first controls are respectively in different switch states before being merged into the second control, the two first controls may be first switched to a same state, and then merged into the second control.

For example, if the control A corresponding to the wireless local area network switch is in an enabled state and the control B corresponding to the mobile data traffic switch is in a disabled state, the control A may be switched to the disabled state first, and then the control A and the control B are merged into one second control, or the control B may be switched to the enabled state first, and the control A and the control B are merged into one second control.

In addition, the two first controls may be kept in original states, and in a case that the fourth input whose input feature is the first feature is received at the first time, the two first controls are switched to a same state. For example, the control A corresponding to the wireless local area network switch is in the enabled state, and the control B corresponding to the mobile data traffic switch is in the disabled state. After the control A and the control B are merged into one second control, the wireless local area network switch is still in the enabled state, and the mobile data traffic switch is in the disabled state. When a tapping input that is performed on the second control by the user is received, the control A is switched to the disabled state. When a tapping input that is performed on the second control by the user is received again, the control A and the control B are switched to the enabled state.

In this embodiment, the preset sequence may refer to a specific time sequence. For example, an application may be enabled or disabled first, and then another application is enabled or disabled after a preset time interval.

In an embodiment, the applications indicated by the two first controls associated with the second target control are respectively a document processing application and a screen projection application. When a sliding operation performed by the user on the second target control is received, applications are successively controlled to be enabled or disabled. For example, when the sliding input is an operation of sliding from the document processing application to the screen projection application, the document processing application is first enabled, and then one minute is reserved for the user to select a document. Then, after the document processing application is enabled for one minute, the screen projection application is enabled, so that a screen projection operation is performed on a document in the document processing application by using the screen projection application.

A program function of switching the application program in this embodiment may be switching a program function enabled/disabled state of the application, or may be switching a program function of the application to different states.

For example, for the Bluetooth switch, the wireless local area network switch, a switch of a flight mode, and the like, program functions of these applications have two states: enabled and disabled. During implementation, when the fourth input that is performed on the second target control by the user is received, program functions of these applications are switched from one state to another state.

In an embodiment, the two first controls associated with the second target control are respectively the wireless local area network switch and the mobile data traffic switch, where the wireless local area network switch is in the enabled state, and the mobile data traffic switch is in the disabled state. When a double tapping operation performed by the user on the second target control is received, the wireless local area network switch is switched to the disabled state, and the mobile data traffic switch is switched to the enabled state.

In another embodiment, a program function for switching the application includes a switch in a power saving mode and a display brightness switch. The power saving mode includes three states: super power saving, regular power saving, and a normal mode, and display brightness includes three levels: 50% brightness, 70% brightness, and 100% brightness. When the fourth input that is performed on the second target control by the user is received, the power saving mode is switched to a super power saving mode and the display brightness is switched to 50% brightness. When the fourth input that is performed on the second target control by the user is received again, the power saving mode is switched to normal power saving and the display brightness is switched to 70% brightness. When the fourth input that is performed on the second target control by the user is received again, the power saving mode is switched to the normal mode and the display brightness is switched to 100% brightness. In this way, a program function of an application having two or more states can be switched.

In this embodiment, different first features, second features, and third features are set, to separately implement different control manners for applications corresponding to multiple controls associated with the second control or program functions of the applications, which can meet different control manners required by different controlled use requirements, thereby improving program function flexibility of controlling the application and the program function of the application.

It should be noted that, the menu display method provided in this embodiment of this application may be performed by a menu display apparatus or a control module that is in the menu display apparatus and that is configured to perform and load the menu display method. In this embodiment of this application, the menu display method provided in this embodiment of this application is described an example in which the menu display apparatus performs and loads the menu display method.

Figure 20:
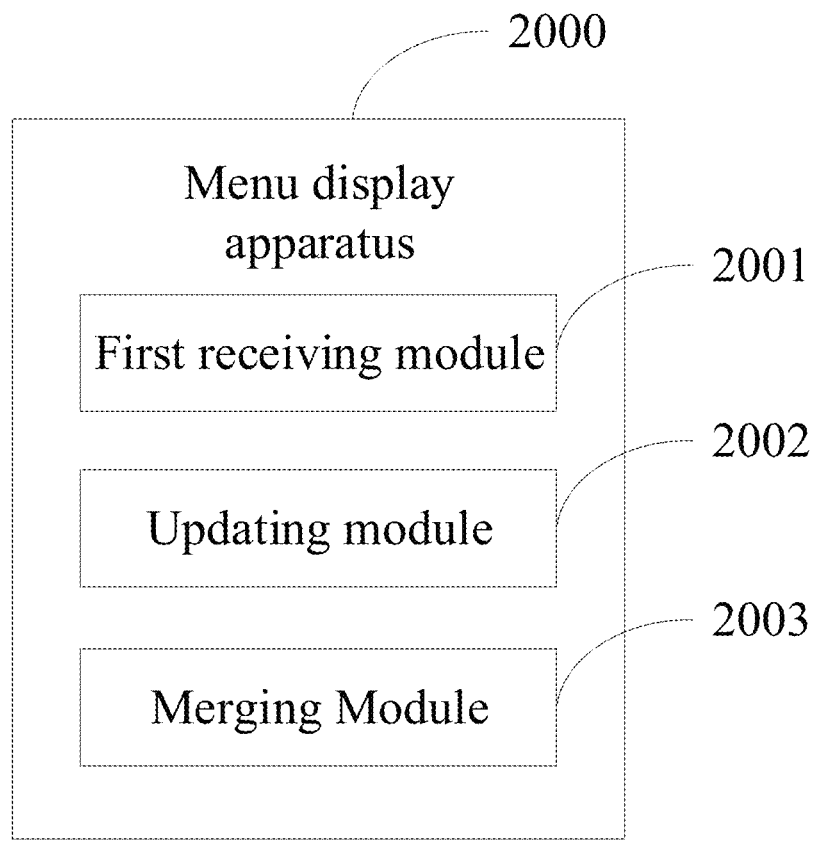
FIG. 20 is a schematic structural diagram of a menu display apparatus according to an embodiment of this application.

FIG. 20 is a structural diagram of a menu display apparatus according to an embodiment of this application. As shown in FIG. 20, a menu display apparatus 2000 includes:
   a first receiving module 2001, configured to receive a first input that is performed on N first controls in a shortcut menu by a user, where N is a positive integer;
   an updating module 2002, configured to: in a case that N is equal to 1, update a display status of the first control from a first display size to a second display size in response to the first input, where the first display size is less than the second display size; and
   a merging module 2003, configured to: in a case that N is greater than 1, merge the N first controls into M second controls in response to the first input; where
   each second control is obtained by merging at least two first controls, M is a positive integer, and M is less than N.

In some embodiments, the menu display apparatus 2000 further includes:
   a second receiving module, configured to receive a second input that is performed on a first target control in the M second controls by the user; and
   a splitting module, configured to split the first target control into T first controls in response to the second input; where
   T is an integer greater than 1.

In some embodiments, the menu display apparatus 2000 further includes:
   a third receiving module, configured to receive a third input that is performed on the first control with a second display size by the user; and
   the updating module 2002 is further configured to update the display status of the first control from the second display size to the first display size in response to the third input.

In some embodiments, the menu display apparatus 2000 further includes:
   a fourth receiving module, configured to receive a fourth input that is performed on a second target control in the M second controls by the user, where the second target control is obtained by merging T first controls; and
   an execution module, configured to perform, in response to the fourth input, target processing on T applications indicated by the T first controls.

In some embodiments, the execution module includes:
   an input feature obtaining submodule, configured to obtain an input feature of the fourth input; and
   an execution submodule, configured to perform target processing associated with the input feature on the T applications indicated by the T first controls.

In some embodiments, the execution submodule includes:
   a first execution unit, configured to: in a case that the input feature is a preset first feature, enable or disable, in an association manner, the T applications indicated by the T first controls;
   a second execution unit, configured to: in a case that the input feature is a preset second feature, enable or disable, in a preset sequence, the T applications indicated by the T first controls; and
   a third execution unit, configured to: in a case that the input feature is a preset third feature, switch program functions of the T applications indicated by the T first controls.

The menu display apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, a vehicle-mounted terminal device, a wearable device, an Ultra-Mobile Personal Computer (UMPC), a netbook, or a Personal Digital Assistant (PDA), and the non-mobile terminal device may be a Personal Computer (PC), a Television (TV), a counter, or a self-service computer. This is not specifically limited in this embodiment of this application.

The menu display apparatus in this embodiment of this application may be an apparatus with an operating system. The operating system may be an Android operating system, may be an iOS operating system, or may be another possible operating system. This is not specifically limited in this embodiment of this application.

The menu display apparatus provided in this embodiment of this application can implement processes implemented by the menu display apparatus in the method embodiment of FIG. 1. To avoid repetition, details are not described herein again.

Figure 21:
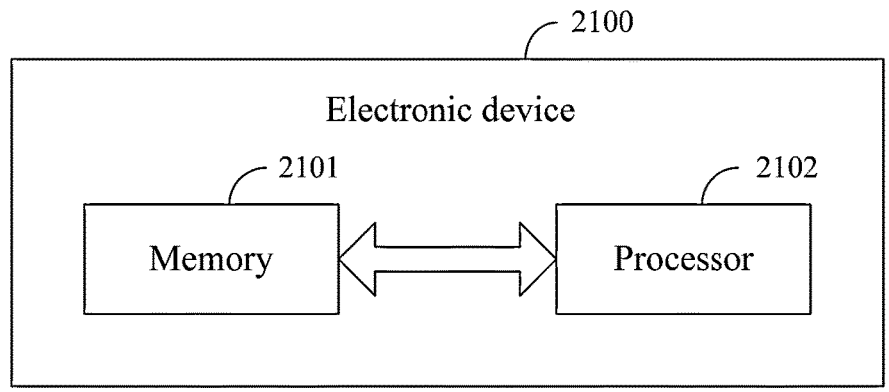
FIG. 21 is a schematic structural diagram of an electronic device according to an embodiment of this application.

In some embodiments, as shown in FIG. 21, an embodiment of this application further provides an electronic device 2100, including a processor 2102, a memory 2101, and a program or an instruction that is stored in the memory 2101 and that can run on the processor 21102. When the program or the instruction is executed by the processor 2102, processes of the embodiments of the menu display method can be implemented, and a same technical effect can be achieved. To avoid repetition, details are not described herein.

It should be noted that the electronic device in this embodiment of this application includes the foregoing mobile electronic device and the foregoing non-mobile electronic device.

Figure 22:
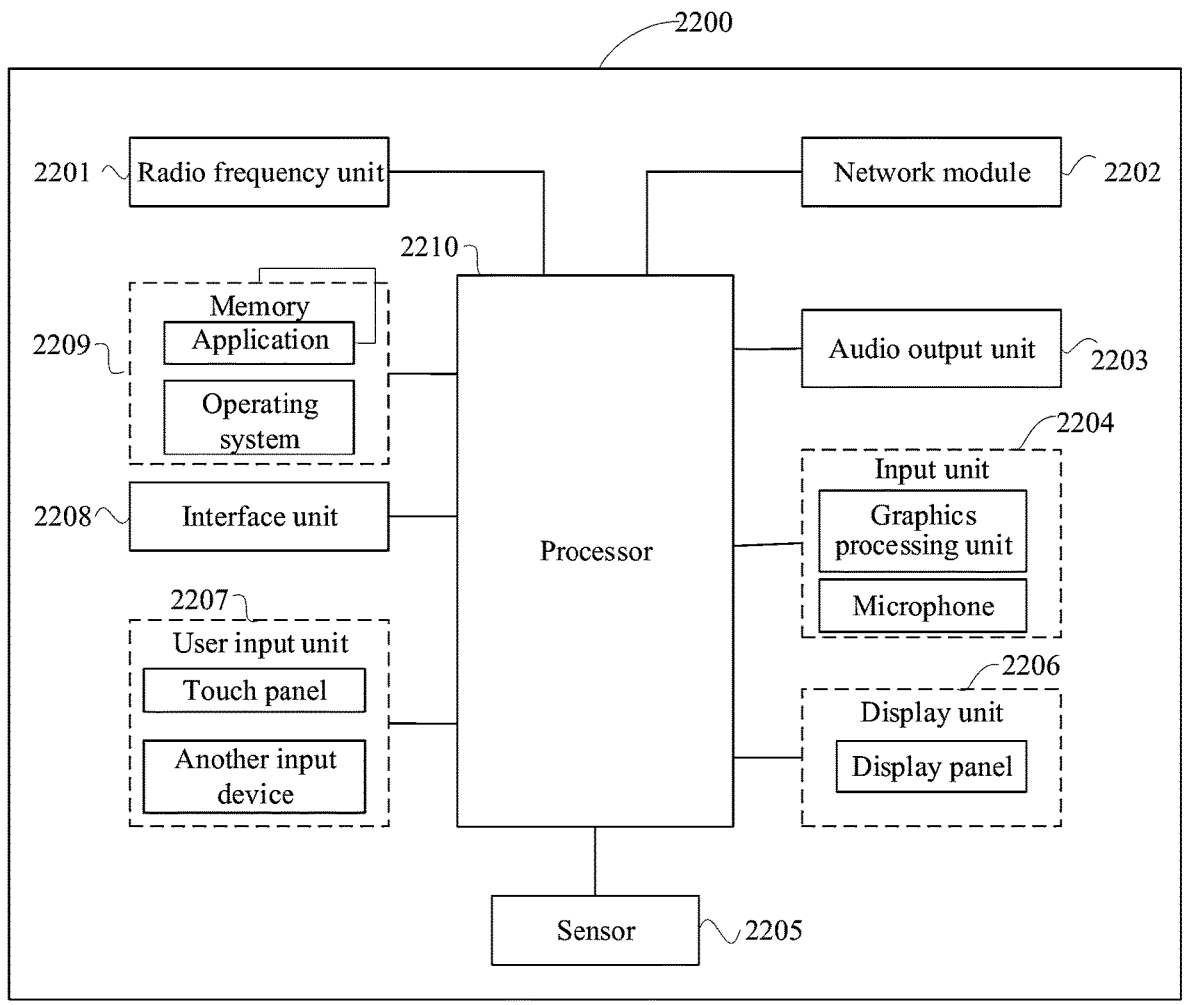
FIG. 22 is a schematic diagram of a structure of another electronic device according to an embodiment of this application.

FIG. 22 is a schematic diagram of a hardware structure of an electronic device for implementing embodiments of this application.

The electronic device 2200 includes but is not limited to components such as a radio frequency unit 2201, a network module 2202, an audio output unit 2203, an input unit 2204, a sensor 2205, a display unit 2206, a user input unit 2207, an interface unit 2208, a memory 2209, and a processor 2210.

It may be understood by a person skilled in the art that the electronic device 2200 may further include a power supply (such as a battery) that supplies power to each component. The power supply may be logically connected to the processor 2210 by using a power management system, to implement functions such as charging, discharging, and power consumption management by using the power management system. A structure of the electronic device shown in FIG. 22 does not constitute a limitation on the electronic device, and may include more or fewer parts than those shown in the figure, or merge some components, or have different part arrangements. Details are not described herein again.

The input unit 2204 is configured to receive a first input that is performed on N first controls in a shortcut menu by a user, where N is a positive integer.

The processor 2210 is configured to: in a case that N is equal to 1, update a display status of the first control from a first display size to a second display size in response to the first input, where the first display size is less than the second display size; and in a case that N is greater than 1, merge the N first controls into M second controls in response to the first input; where each second control is obtained by merging at least two first controls, M is a positive integer, and M is less than N.

An embodiment of this application further provides a readable storage medium. A program or an instruction is stored in the readable storage medium. When the program or the instruction is executed by a processor, processes of the embodiment of the menu display method can be implemented, and a same technical effect can be achieved. To avoid repetition, details are not described herein.

The processor is a processor in the electronic device in the foregoing embodiment. The readable storage medium includes a computer-readable storage medium such as a Read-Only Memory (ROM), a Random Access Memory (RAM), a magnetic disk, an optical disc, or the like.

An embodiment of this application further provides a chip. The chip includes a processor and a communication interface, the communication interface is coupled to the processor, and the processor is configured to run a program or an instruction to implement processes of the embodiment of the menu display method, and a same technical effect can be achieved. To avoid repetition, details are not described herein again.

It should be understood that the chip mentioned in this embodiment of this application may also be referred to as a system-level chip, a system chip, a chip system, or a system on a chip.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not exclude another same element in a process, method, article, or apparatus that includes the element. In addition, it should be noted that a scope of the method and the apparatus in the embodiments of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

According to the descriptions of the foregoing implementations, a person skilled in the art may clearly understand that the foregoing method embodiments may be implemented by using software and a required universal hardware platform, or may be implemented by using hardware. In some embodiments, the technical solutions of this application or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of this application.

The embodiments of this application are described with reference to the accompanying drawings. However, this application is not limited to the foregoing implementations. The foregoing implementations are merely examples, but are not limiting. A person of ordinary skill in the art may make many forms without departing from the objective and the scope of the claims of this application, and these forms all fall within the protection scope of this application.

The invention claimed is:

1. A menu display method, comprising:
receiving a first input that is performed on N first controls in a shortcut menu by a user, wherein N is a positive integer; and
when N is equal to 1, updating a display status of the first control from a first display size to a second display size in response to the first input, wherein the first display size is less than the second display size, or when N is greater than 1, merging the N first controls into M second controls in response to the first input, wherein
each second control is obtained by merging at least two first controls, such that a single input on each second control simultaneously controls multiple applications corresponding to the at least two first controls, wherein M is a positive integer, and M is less than N.

2. The menu display method according to claim 1, wherein when N is greater than 1, after the merging the N first controls into M second controls in response to the first input, the method further comprises:
receiving a second input that is performed on a first target control in the M second controls by the user; and
splitting the first target control into T first controls in response to the second input, wherein
T is an integer greater than 1.

3. The menu display method according to claim 1, wherein when N is equal to 1, after the updating a display status of the first control from a first display size to a second display size in response to the first input, the method further comprises:
receiving a third input that is performed on the first control with a second display size by the user; and
updating the display status of the first control from the second display size to the first display size in response to the third input.

4. The menu display method according to claim 1, wherein when N is greater than 1, after the merging the N first controls into M second controls in response to the first input, the method further comprises:
receiving a fourth input that is performed on a second target control in the M second controls by the user, wherein the second target control is obtained by merging T first controls; and performing, in response to the fourth input, target processing on T applications indicated by the T first controls.

5. The menu display method according to claim 4, wherein the performing, in response to the fourth input, target processing on T applications indicated by the T first controls comprises:
obtaining an input feature of the fourth input; and
performing target processing associated with the input feature on the T applications indicated by the T first controls.

6. The menu display method according to claim 5, wherein the performing target processing associated with the input feature on the T applications indicated by the T first controls comprises:
when the input feature is a preset first feature, enabling or disabling, in an association manner, the T applications indicated by the T first controls;
when the input feature is a preset second feature, enabling or disabling, in a preset sequence, the T applications indicated by the T first controls; or
when the input feature is a preset third feature, switching program functions of the T applications indicated by the T first controls.

7. An electronic device, comprising: a memory having a computer program stored thereon; and a processor, wherein the computer program, when executed by the processor, causes the processor to perform operations comprising:
receiving a first input that is performed on N first controls in a shortcut menu by a user, wherein N is a positive integer; and
when N is equal to 1, updating a display status of the first control from a first display size to a second display size in response to the first input, wherein the first display size is less than the second display size, or when N is greater than 1, merging the N first controls into M second controls in response to the first input, wherein each second control is obtained by merging at least two first controls, such that a single input on each second control simultaneously controls multiple applications corresponding to the at least two first controls, wherein M is a positive integer, and M is less than N.

8. The electronic device according to claim 7, wherein when N is greater than 1, after the merging the N first controls into M second controls in response to the first input, when executed by the processor, the computer program causes the processor to further perform operations comprising:
receiving a second input that is performed on a first target control in the M second controls by the user; and
splitting the first target control into T first controls in response to the second input, wherein
T is an integer greater than 1.

9. The electronic device according to claim 7, wherein when N is equal to 1, after the updating a display status of the first control from a first display size to a second display size in response to the first input, when executed by the processor, the computer program causes the processor to further perform operations comprising:
receiving a third input that is performed on the first control with a second display size by the user; and
updating the display status of the first control from the second display size to the first display size in response to the third input.

10. The electronic device according to claim 7, wherein when N is greater than 1, after the merging the N first controls into M second controls in response to the first input, when executed by the processor, the computer program causes the processor to further perform operations comprising:
receiving a fourth input that is performed on a second target control in the M second controls by the user, wherein the second target control is obtained by merging T first controls; and
performing, in response to the fourth input, target processing on T applications indicated by the T first controls.

11. The electronic device according to claim 10, wherein the performing, in response to the fourth input, target processing on T applications indicated by the T first controls comprises:
obtaining an input feature of the fourth input; and
performing target processing associated with the input feature on the T applications indicated by the T first controls.

12. The electronic device according to claim 11, wherein the performing target processing associated with the input feature on the T applications indicated by the T first controls comprises:
when the input feature is a preset first feature, enabling or disabling, in an association manner, the T applications indicated by the T first controls;
when the input feature is a preset second feature, enabling or disabling, in a preset sequence, the T applications indicated by the T first controls; or
when the input feature is a preset third feature, switching program functions of the T applications indicated by the T first controls.

13. A non-transitory readable storage medium storing a program or an instruction, wherein the program or the instruction, when executed by a processor, causes the processor to perform operations comprising:
receiving a first input that is performed on N first controls in a shortcut menu by a user, wherein N is a positive integer; and
when N is equal to 1, updating a display status of the first control from a first display size to a second display size in response to the first input, wherein the first display size is less than the second display size, or when N is greater than 1, merging the N first controls into M second controls in response to the first input, wherein each second control is obtained by merging at least two first controls, such that a single input on each second control simultaneously controls multiple applications corresponding to the at least two first controls, wherein M is a positive integer, and M is less than N.

14. The non-transitory computer-readable storage medium according to claim 13, wherein when N is greater than 1, after the merging the N first controls into M second controls in response to the first input, when executed by a processor, the program or the instruction causes the processor to further perform operations comprising:
receiving a second input that is performed on a first target control in the M second controls by the user; and
splitting the first target control into T first controls in response to the second input, wherein
T is an integer greater than 1.

15. The non-transitory computer-readable storage medium according to claim 13, wherein when N is equal to 1, after the updating a display status of the first control from a first display size to a second display size in response to the first input, when executed by a processor, the program or the instruction causes the processor to further perform operations comprising:

receiving a third input that is performed on the first control with a second display size by the user; and updating the display status of the first control from the second display size to the first display size in response to the third input.

16. The non-transitory computer-readable storage medium according to claim 13, wherein when N is greater than 1, after the merging the N first controls into M second controls in response to the first input, when executed by a processor, the program or the instruction causes the processor to further perform operations comprising:

receiving a fourth input that is performed on a second target control in the M second controls by the user, wherein the second target control is obtained by merging T first controls; and performing, in response to the fourth input, target processing on T applications indicated by the T first controls.

17. The non-transitory computer-readable storage medium according to claim 16, wherein the performing, in response to the fourth input, target processing on T applications indicated by the T first controls comprises:

obtaining an input feature of the fourth input; and performing target processing associated with the input feature on the T applications indicated by the T first controls.

18. The non-transitory computer-readable storage medium according to claim 17, wherein the performing target processing associated with the input feature on the T applications indicated by the T first controls comprises:

when the input feature is a preset first feature, enabling or disabling, in an association manner, the T applications indicated by the T first controls;

when the input feature is a preset second feature, enabling or disabling, in a preset sequence, the T applications indicated by the T first controls; or when the input feature is a preset third feature, switching program functions of the T applications indicated by the T first controls.

\* \* \* \* \*